United States Patent
Severance et al.

(10) Patent No.: US 12,223,322 B2
(45) Date of Patent: Feb. 11, 2025

(54) EMBEDDED PROCESSOR SUPPORTING FIXED-FUNCTION KERNELS

(71) Applicant: Microchip Technology Inc., Chandler, AZ (US)

(72) Inventors: Aaron Severance, Pender Island (CA); Jonathan W. Greene, Palo Alto, CA (US); Joel Vandergriendt, Maple Ridge (CA)

(73) Assignee: Microchip Technology Inc., Chandler, AZ (US)

( * ) Notice: Subject to any disclaimer, the term of this patent is extended or adjusted under 35 U.S.C. 154(b) by 232 days.

(21) Appl. No.: 17/852,304

(22) Filed: Jun. 28, 2022

(65) Prior Publication Data
US 2023/0116391 A1 Apr. 13, 2023

Related U.S. Application Data

(60) Provisional application No. 63/253,472, filed on Oct. 7, 2021.

(51) Int. Cl.
*G06F 9/30* (2018.01)

(52) U.S. Cl.
CPC ........ *G06F 9/30036* (2013.01); *G06F 9/3001* (2013.01); *G06F 9/30065* (2013.01)

(58) Field of Classification Search
CPC ............... G06F 9/30036; G06F 9/3001; G06F 9/30065; G06F 15/7867; G06F 9/3885
See application file for complete search history.

(56) References Cited

U.S. PATENT DOCUMENTS

| | | |
|---|---|---|
| 4,873,459 A | 10/1989 | ElGamal et al. |
| 4,910,417 A | 3/1990 | Gamal et al. |
| 4,961,002 A | 10/1990 | Tam et al. |
| 5,017,813 A | 5/1991 | Galbraith et al. |
| 5,055,718 A | 10/1991 | Galbraith et al. |
| 5,093,900 A | 3/1992 | Graf |
| 5,095,228 A | 3/1992 | Galbraith et al. |
| 5,132,571 A | 7/1992 | McCollum et al. |
| 5,191,241 A | 3/1993 | McCollum et al. |
| 5,198,705 A | 3/1993 | Galbraith et al. |
| 5,440,245 A | 8/1995 | Galbraith et al. |
| 5,610,534 A | 3/1997 | Galbraith et al. |
| 5,724,276 A | 3/1998 | Rose et al. |
| 5,781,033 A | 7/1998 | Galbraith et al. |

(Continued)

FOREIGN PATENT DOCUMENTS

| | | |
|---|---|---|
| JP | 3987255 B2 | 10/2007 |
| WO | 2018201060 A1 | 11/2018 |

OTHER PUBLICATIONS

M. Guillorn, FinFET performance advantage at 22nm: An AC perspective, 2008, IEEE Symposium on VLSI Technology, 12-13. DOI:https://doi.org/10.1109/VLSIT.2008.4588544.

(Continued)

*Primary Examiner* — Farley Abad
(74) *Attorney, Agent, or Firm* — Glass & Associates; Alan Heimlich; Kenneth Glass

(57) ABSTRACT

A method and apparatus for embedding a microprocessor in a programmable logic device (PLD), where the microprocessor has a logic unit that can operate in two modes. A first mode is a general purpose mode running at least one general purpose process related to the PLD, and a second mode is a fixed function mode emulating a fixed function for use by logic configured into a fabric of the PLD (fabric). A memory unit is coupled to the logic unit and to the fabric, and the fabric is operable for transferring signals with the logic unit in relation to the fixed function.

14 Claims, 26 Drawing Sheets

(56) References Cited

U.S. PATENT DOCUMENTS

| | | | |
|---|---|---|---|
| 5,832,215 A | 11/1998 | Kato et al. | |
| 6,735,748 B1 | 5/2004 | Teig et al. | |
| 6,781,408 B1 | 8/2004 | Langhammer | |
| 6,857,112 B1 | 2/2005 | Teig et al. | |
| 6,883,148 B1 | 4/2005 | Teig et al. | |
| 6,892,366 B1 | 5/2005 | Teig et al. | |
| 7,051,293 B1 | 5/2006 | Teig et al. | |
| 7,185,299 B1 | 2/2007 | Jayaraman | |
| 7,268,584 B1 | 9/2007 | Cashman et al. | |
| 7,430,137 B2 | 9/2008 | Greene et al. | |
| 7,463,061 B1 | 12/2008 | Greene et al. | |
| 7,480,786 B1* | 1/2009 | Crabill | G06F 30/331 712/34 |
| 7,735,039 B1 | 6/2010 | Dasasathyan et al. | |
| 7,804,321 B2 | 9/2010 | Greene et al. | |
| 7,816,946 B1 | 10/2010 | Hecht et al. | |
| 7,882,471 B1 | 2/2011 | Kariat et al. | |
| 7,884,640 B2 | 2/2011 | Greene et al. | |
| 7,919,977 B2 | 4/2011 | Greene et al. | |
| 7,932,744 B1 | 4/2011 | Greene et al. | |
| 7,932,745 B2 | 4/2011 | Hecht et al. | |
| 8,415,650 B2 | 4/2013 | Greene et al. | |
| 8,723,151 B2 | 5/2014 | Greene et al. | |
| 8,769,380 B1 | 7/2014 | Burd et al. | |
| 8,981,328 B2 | 3/2015 | Greene et al. | |
| 9,000,807 B2 | 4/2015 | Greene et al. | |
| 9,103,880 B2 | 8/2015 | Greene et al. | |
| 9,147,836 B2 | 9/2015 | Greene et al. | |
| 9,514,804 B2 | 12/2016 | Greene | |
| 9,991,894 B2 | 6/2018 | Greene et al. | |
| 10,256,822 B2 | 4/2019 | Greene et al. | |
| 10,361,702 B2 | 7/2019 | Greene et al. | |
| 10,515,135 B1* | 12/2019 | Zejda | G06F 17/12 |
| 10,523,208 B2 | 12/2019 | Hecht et al. | |
| 10,678,724 B1* | 6/2020 | ChoFleming | H04L 67/60 |
| 10,714,180 B2 | 7/2020 | McCollum et al. | |
| 10,855,286 B2 | 12/2020 | Greene et al. | |
| 10,936,286 B2 | 3/2021 | Greene et al. | |
| 10,971,216 B2 | 4/2021 | Greene et al. | |
| 11,023,559 B2 | 6/2021 | McCollum et al. | |
| 11,355,187 B2 | 6/2022 | Nguyen et al. | |
| 2009/0013293 A1 | 1/2009 | Buehler et al. | |
| 2011/0231731 A1 | 9/2011 | Gross et al. | |
| 2012/0068229 A1 | 3/2012 | Bemanian et al. | |
| 2012/0319730 A1 | 12/2012 | Fitton et al. | |
| 2014/0237313 A1 | 8/2014 | Wang et al. | |
| 2016/0246571 A1 | 8/2016 | Walters, III | |
| 2016/0315619 A1 | 10/2016 | Fan et al. | |
| 2017/0149446 A1 | 5/2017 | Tao et al. | |
| 2018/0095930 A1 | 4/2018 | Lu et al. | |
| 2019/0057174 A1 | 2/2019 | Hashimoto | |
| 2019/0121928 A1 | 4/2019 | Wu et al. | |
| 2019/0190522 A1 | 6/2019 | Greene et al. | |
| 2019/0213234 A1 | 7/2019 | Bayat et al. | |
| 2020/0019375 A1 | 1/2020 | Pugh et al. | |
| 2020/0020393 A1 | 1/2020 | Al-Shamma | |
| 2020/0150925 A1 | 5/2020 | Greene et al. | |
| 2020/0233482 A1 | 7/2020 | Tran et al. | |
| 2020/0234111 A1 | 7/2020 | Tran et al. | |
| 2021/0028795 A1 | 1/2021 | Graumann | |
| 2021/0173993 A1 | 6/2021 | Raman et al. | |
| 2021/0226661 A1* | 7/2021 | de Haas | H04B 1/40 |
| 2021/0232658 A1 | 7/2021 | McCollum et al. | |
| 2022/0382945 A1 | 12/2022 | Greene et al. | |

OTHER PUBLICATIONS

C. Chiasson, V. Betz, COFFE: Fully-automated transistor sizing for FPGA, 2013, 2013 International Conference on Field-Programmable Technology (FPT) 34-41. DOI:https://doi.org/10.1109/FPT.2013.6718327.

D. Lewis, The Stratix routing and logic architecture, 2003, In Proceedings of the 2003 ACM/SIGDA eleventh international symposium on Field programmable gate arrays, 12-20. DOI: https://doi.org/10.1145/611817.611821.

L.T. Pillage and R.A. Rohrer, Asymptotic waveform evaluation for timing analysis., 1990, IEEE Transactions on Computer-Aided Design of Integrated Circuits and Systems, 9(4), 352-366. DOI:https://doi.org/10.1109/43.45867.

Martin, T., Gréwal, G., & Areibi, S., A Machine Learning Approach to Predict Timing Delays During FPGA Placement, Jun. 2021, 2021 IEEE International Parallel and Distributed Processing Symposium Workshops (IPDPSW) (pp. 124-127). IEEE. DOI: https://doi.org/10.1109/IPDPSW52791.2021.00026.

Myeong-Eun Hwang et al: "Slope Interconnect Effort: Gate-Interconnect Interdependent Delay Modeling for Early CMOS Circuit Simulation", IEEE Transactions on Circuits and Systems I: Regular Papers, IEEE, US, vol. 56, No. 7, Jul. 1, 2009 (Jul. 1, 2009), pp. 1428-1441, pp. 1431-1433, XP011280499, ISSN: 1549-8328, DOI: 10.1109/TCSI.2008.2006217.

P. Maidee, C. Neely, A. Kaviani and C. Lavin, An Open-Source Lightweight Timing Model for RapidWright, 2019, International Conference on Field-Programmable Tech., 171-178, DOI: 10.1109/ICFPT47387.2019.00028.

Raman, M., Abdallah, N., & Dunoyer, J., An Artificial Intelligence Approach to EDA Software Testing: Application to Nel Delay Algorithms in FPGAs, Mar. 2019, 20th International Symposium on Quality Electronic Design (ISQED) (pp. 311-316). IEEE. DOI:https://doi.org/10.1109/ISQED.2019.8697652.

Seung-Soo Han et al: A deep learning methodology to proliferate golden signoff timing, 11, Design, Automati on, and Test in Europe Conference and Exhibition Proceedings, pp. 1-6, Mar. 1, 2014.

Shrager, R. L., & Hill, E., Nonlinear curve-fitting in the $?_1$, and $L_\infty$ norms, 1980, Mathematics of Computation, 34(150), 529-541. DOI:https://doi.org/10.1090/S0025-5718-1980-0559201-X.

W. Elmore, The transient response of damped linear networks with particular regard to wideband amplifiers, 1948, Journal of Applied Physics 19(1), 55-63. DOI:https://doi.org/10.1063/1.1697872.

Lu Yaojie et al: "Vector Coprocessor Virtualization for Simultaneous Multithreading", ACM Transactions on Embedded Computing Systems, ACM, New York, NY, US, vol. 15, No. 3, May 23, 2016 (May 23, 2016), pp. 1-25, XP058676798, ISSN: 1539-9087, DOI: 10.1145/2898364 abstract; figures 1-14; tables I-XIV p. 3, paragraph 2-p. 25, paragraph 1.

PCT/US2022/028744, Invitation to Pay Additional Fees and, Where Applicable, Protest Fees, European Patent Office, mailed Sep. 1, 2022.

"Virtex-4 FPGA User Guide", UG070 (v2.6), Xilinx, Inc., San Jose, CA, Dec. 1, 2008.

B. Khurshid and R. N. Mir, "High efficiency generalized parallel counters for look-up table based FPGAs," International Journal of Reconfigurable Computing, vol. 2015, Article ID 518272, 16 pages, 2015 (Year: 2015).

J. Hormigo, M. Ortiz, F. Quiles, F. J. Jaime, J. Villalba and E. L. Zapata, "Efficient Implementation of Carry-Save Adders in FPGAs," 2009 20th IEEE International Conference on Application-specific Systems, Architectures and Processors, pp. 207-210, 2009 (Year: 2009).

M. Kumm and P. Zipf, "Efficient High Speed Compression Trees on Xilinx FPGAs," in Methoden und Beschreibungssprachen zur Modellierung und Verifikation von Schaltungen und Systemen (MBMV), pp. 171-182, 2014 (Year: 2014).

Michael T Frederick et al, "Beyond the arithmetic constraint", FPGA 2008 : Sixteenth ACM/SIGDA International Symposium on Field-Programmable Gate Arrays, Feb. 24, 2008 (Feb. 24, 2008), pp. 37-46, XP058166147,DOI: 10.1145/1344671.1344679, ISBN: 978-1-59593-934-0, Monterey Beach Resort, Monterey, California, USA, Feb. 24-26, 2008, New York, NY : Association for Computing Machinery, US.

Thomas B Preusser et al, "Enhancing FPGA Device Capabilities by the Automatic Logic Mapping to Additive Carry Chains", Field Programmable Logic and Applications (FPL), Aug. 31, 2010 (Aug. 31, 2010), pp. 318-325, XP031854525, ISBN: 978-1-4244-7842-2, 2010 International Conference on, IEEE, Piscataway, NJ, USA.

Thomas B Preusser et al., "Mapping basic prefix computations to fast carry-chain structures", Field Programmable Logic and Appli-

(56) References Cited

OTHER PUBLICATIONS cations (FPL) 2009 International Conference on, IEEE, Piscataway, NJ, USA, Aug. 31, 2009 (Aug. 31, 2009), pp. 604-608, p. 605, left-hand column, paragraph 3-p. 607, left-hand column paragraph 5; figures 1,2.
Thomas B. Preusser et al., "Enhancing FPGA Device Capabilities by the Automatic Logic Mapping to Additive Carry Chains", Field Programmable Logic and Applications (FPL), 2010 International Conference on, IEEE, Piscataway, NJ, USA, Aug. 31, 2010 (Aug. 31, 2010), pp. 318-325.
PCT/US22/036475, "International Search Report and Written Opinion," European Patent Office, mailed Jan. 16, 2023.
"Intel® Arria® 10 Native Fixed Point DSP IP Core User Guide", Intel Corporation, Mar. 13, 2017.
"LatticeECP4 DSP Slice Architecture", White Paper, Lattice Semiconductor, Hillsboro Oregon, Nov. 2011.
"UltraScale Architecture DSP Slice User Guide", Xilinx Corporation, (v1.4) Jun. 1, 2017.
Bor, et al., "Realization of the CMOS Pulsewidth-Modulation(PWM) Neural Network with On-Chip Learning", IEEE Transactions on Circuits and Systems—II: Analog and Digital Signal Processing, vol. 45, No. 1, pp. 96-107, Jan. 1, 1998.
Hamilton, et al., "Integrated Pulse Stream Neural Networks: Results, Issues, and Pointers", IEEE Transactions on Neural Networks, vol. 3, No. 3, pp. 385-393, May 1992.
Peter Andrew Jamieson, Member, IEEE, and Jonathan Rose, Member, IEEE; Enhancing the Area Efficiency of FPGAs With Hard Circuits Using Shadow Clusters; IEEE Transactions on Very Large Scale Integration (VLSI) Systems, vol. 18, No. 12, Dec. 2010.
Peter, et al., "Enhancing the Area Efficiency of FPGAs With Hard Circuits Using Shadow Clusters", IEEE Transactions on Very Large Scale Integration (VLSI) Systems, vol. 18, No. 12, Dec. 2010.

* cited by examiner

EMBEDDED PROCESSOR SUPPORTING FIXED-FUNCTION KERNELS

CROSS-REFERENCE TO RELATED APPLICATIONS

The present Application claims the benefit under 35 U.S.C. § 119 of the priority date of U.S. Provisional Patent Application Ser. No. 63/253,472 filed on 7 Oct. 2021 by the same inventors, the entire contents of which are incorporated by reference as if fully set forth herein.

BACKGROUND

A processor embedded in a Programmable Logic Device (PLD), such as, but not limited to, a Field Programmable Gate Array (FPGA), comprises a significant amount of circuitry and die area. This is true for both a scalar processor a vector processor.

If the user of a PLD is not using a scalar processor or a vector processor on the PLD then this is a waste of circuitry, die area, and power, without limitation. This presents a technical problem for which a technical solution using a technical means is needed.

BRIEF SUMMARY

In one example, a microprocessor is embedded in a programmable logic device (PLD), where the microprocessor has a logic unit that can operate in two modes. A first mode is a general purpose mode running at least one general purpose process related to the PLD, and a second mode is a fixed function mode emulating a fixed function for use by logic configured into a fabric of the PLD. A memory unit is coupled to the logic unit and to the fabric, and the fabric transfers signals with the logic unit in relation to the fixed function.

In one example, a method of controlling an operation of a microprocessor embedded in a programmable logic device (PLD) is enabled, the method comprising two modes of operation. When the logic unit receives a control signal from a fabric of the PLD, then the logic unit emulates a fixed function for use by the logic configured into the fabric. When there is an absence of the control signal from the fabric at the logic unit, then the logic unit executes at least one general purpose process related to an operation of the PLD.

In one example, the logic unit exchanges signals with a memory unit coupled to the logic unit and to the fabric, where the fabric is operable for transferring signals with the logic unit in relation to the fixed function.

In one example, an integrated circuit (IC) device has a semiconductor die having a conductive matrix disposed within the semiconductor die the conductive matrix communicatively coupling a plurality of components of the IC device disposed within the die and one or more components external thereto. The IC device has a programmable logic device (PLD) disposed within the semiconductor die comprising components coupled using the conductive matrix and comprising a microprocessor, having a logic unit operable in two modes. In a general purpose mode the microprocessor runs at least one general purpose process related to the PLD, and in a fixed function mode the microprocessor emulates a fixed function for use by logic configured into a fabric of the PLD. The IC device may comprise a memory unit coupled to the logic unit and to the fabric of the PLD, wherein the fabric of the PLD transfers signals with the logic unit in relation to the fixed function.

BRIEF DESCRIPTION OF THE DRAWINGS

Some illustrative aspects, features and elements related to example implementations of the present disclosure are described herein with reference to the following description and drawings. Various ways in which the principles disclosed herein are practically implementable are thus described, and all aspects and equivalents thereof are intended to fall within the scope of the claimed subject matter. The foregoing, and other features and uses of the present disclosure, become more apparent in view of the following description in conjunction with each enumerated figure (Figure, FIG.) of the accompanying drawings. Throughout the specification of the present disclosure, the like reference numerals (as shown in each Figure of the drawings) generally refer to the like components, features and/or elements.

DETAILED DESCRIPTION

Overview

In one example, a processor embedded in a PLD can serve some other useful purpose when the customer does not need it as a general purpose processor.

In one example, a processor embedded in a PLD can serve as a configurable fixed function emulator.

In one example, a short, infinite loop program (kernel) is stored in the cache.

In one example, data is streamed in from the fabric and back out to the fabric.

In one example, the data is input/output according to a fixed schedule.

In one example, the embedded processor can serve as a fixed function block implementing various useful functions for the PLD fabric, such as floating-point multiply-add, multiply accumulate, complex multiply, butterfly (for FFT) or matrix-matrix multiply, without limitation.

In one example, the fixed function kernel mode can exchange data with the fabric by aliasing register file registers.

In one example, the fixed function kernel mode exchange of data with the fabric has a deterministic schedule.

In one example, the fixed function kernel mode can be synchronized with the start of the loop with the fabric using a load instruction.

In one example, the embedded processor is one or more scalar processors.

In one example, the embedded processor is a vector processor block (VPB), also referred to as a digital vector processor (DVP).

In one example, the embedded processor is one or more scalar processors and one or more VPBs or DVPs.

Figure 1:
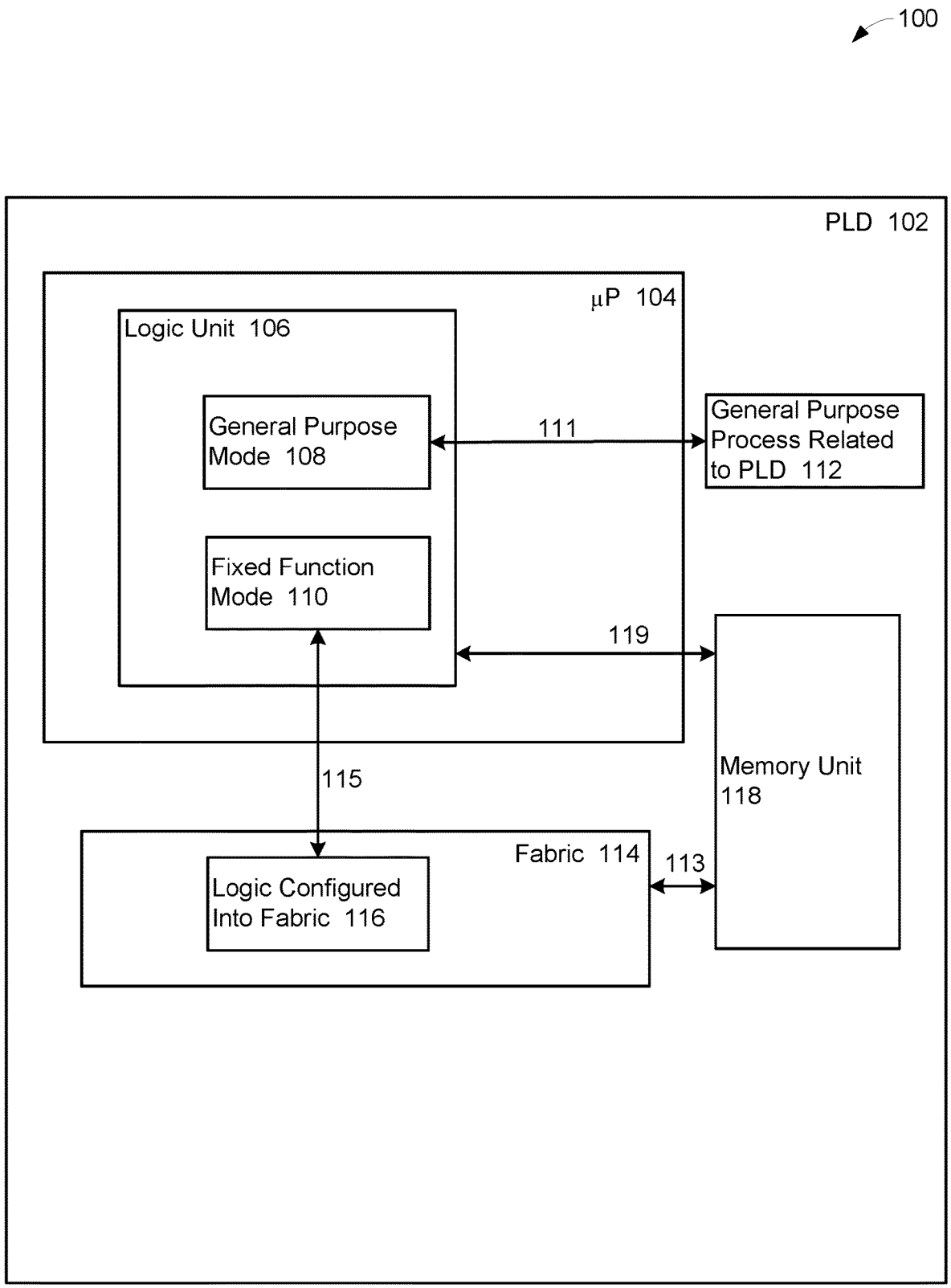
FIG. 1 depicts an example PLD implementation.

FIG. 1 depicts, generally at 100, an example PLD implementation, for example, but not limited to, on a semiconductor die. At 102 is a PLD. At 104 is a microprocessor (µP) having a logic unit 106 which has a general purpose mode 108 and a fixed function mode 110. Via link 111 the general purpose mode 108 is operable with a general purpose process 112 related to the PLD 102. Via link 119 the logic unit 106 is operable with a memory unit 118. At 114 is fabric which has logic configured into fabric 116. Via link 115 the fixed function mode 110 is operable with the logic configured into fabric 116. Via link 113 fabric 114 is operable with memory unit 118.

While a single microprocessor (µP) 104 is shown in FIG. 1 for explanation, it is to be understood that PLD 102 can have more than one microprocessor (µP) 104, with respective logic units 106 having respective general purpose modes 108 and fixed function modes 110, without limitation.

Figure 2:
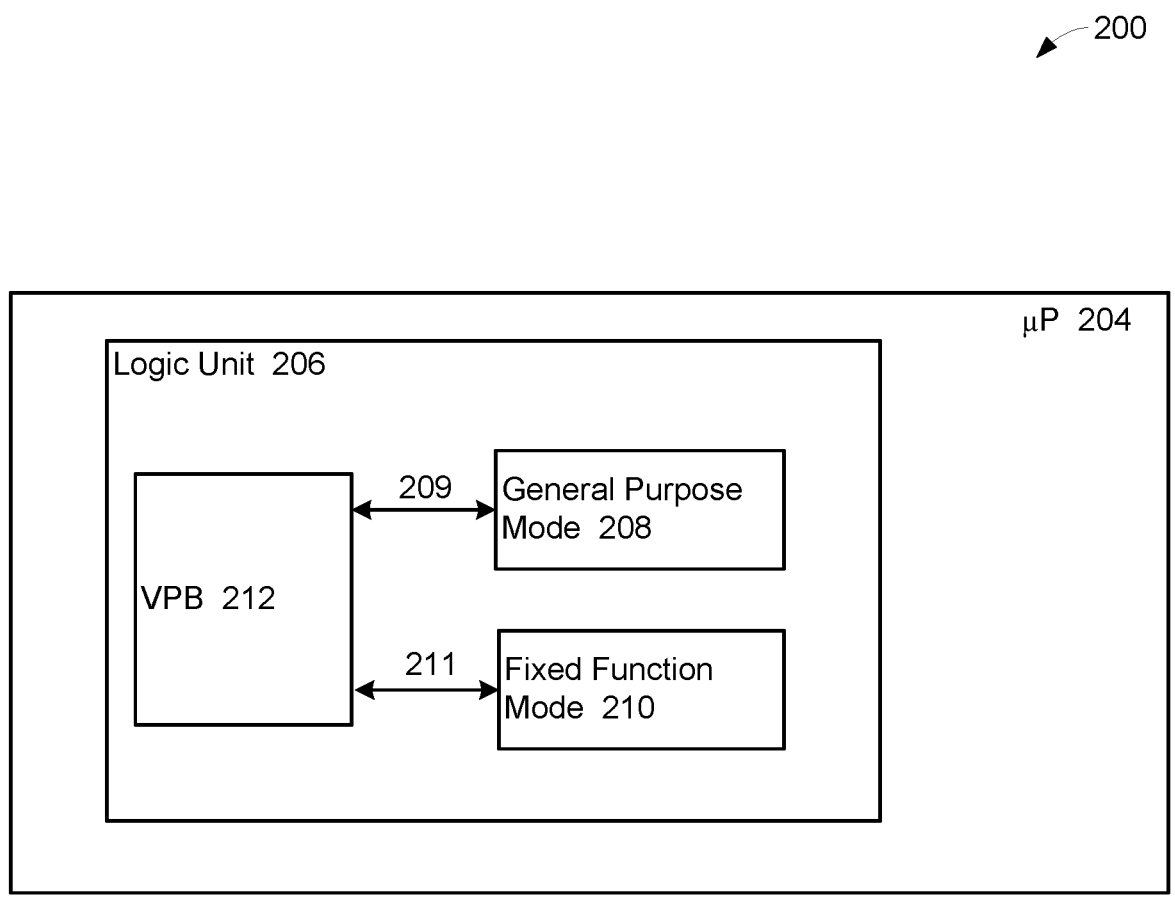
FIG. 2 depicts an example vector processor block (VBP).

FIG. 2 depicts, generally at 200, an example implementation. At 204 is a microprocessor (µP) having a logic unit 206 which has a vector processor block (VPB) 212, a general purpose mode 208, and a fixed function mode 210. The VPB 212 is operable via link 209 in the general purpose mode 208. The VPB 212 is operable via link 211 in the fixed function mode 210.

Figure 3:
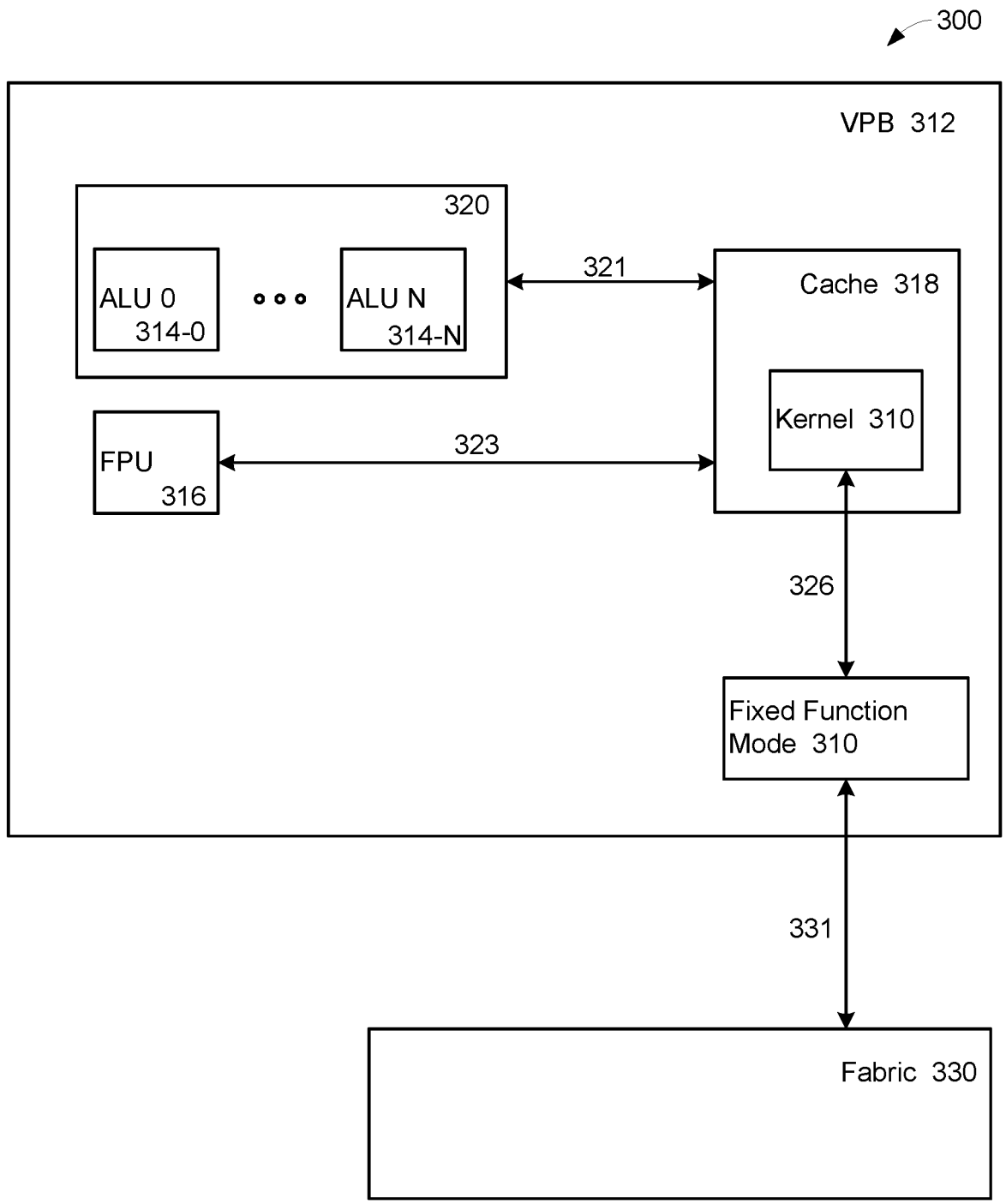
FIG. 3 depicts an example VPB in greater detail.

FIG. 3 depicts, generally at 300, an example implementation. At 312 is a VPB having one or more arithmetic logic unit (ALU) 320 shown respectively as ALU 0 to ALU N 314-0 to 314-N, with an optional floating point unit (FPU) 316. A cache 318 is coupled via 321 or 323 with the one or more ALUs 320 or the FPU 316 respectively. It is noted that the cache 318 can be external of the ALUs 314 or the FPU 316 or disposed within the respective ALUs 314 or the FPU 316. The cache 318 has a Kernel 310 that is operable via link 326 in a fixed function mode 310. The fixed function mode 310, which emulates a fixed function uses data streamed in from the fabric 330 via link 331.

Figure 4:
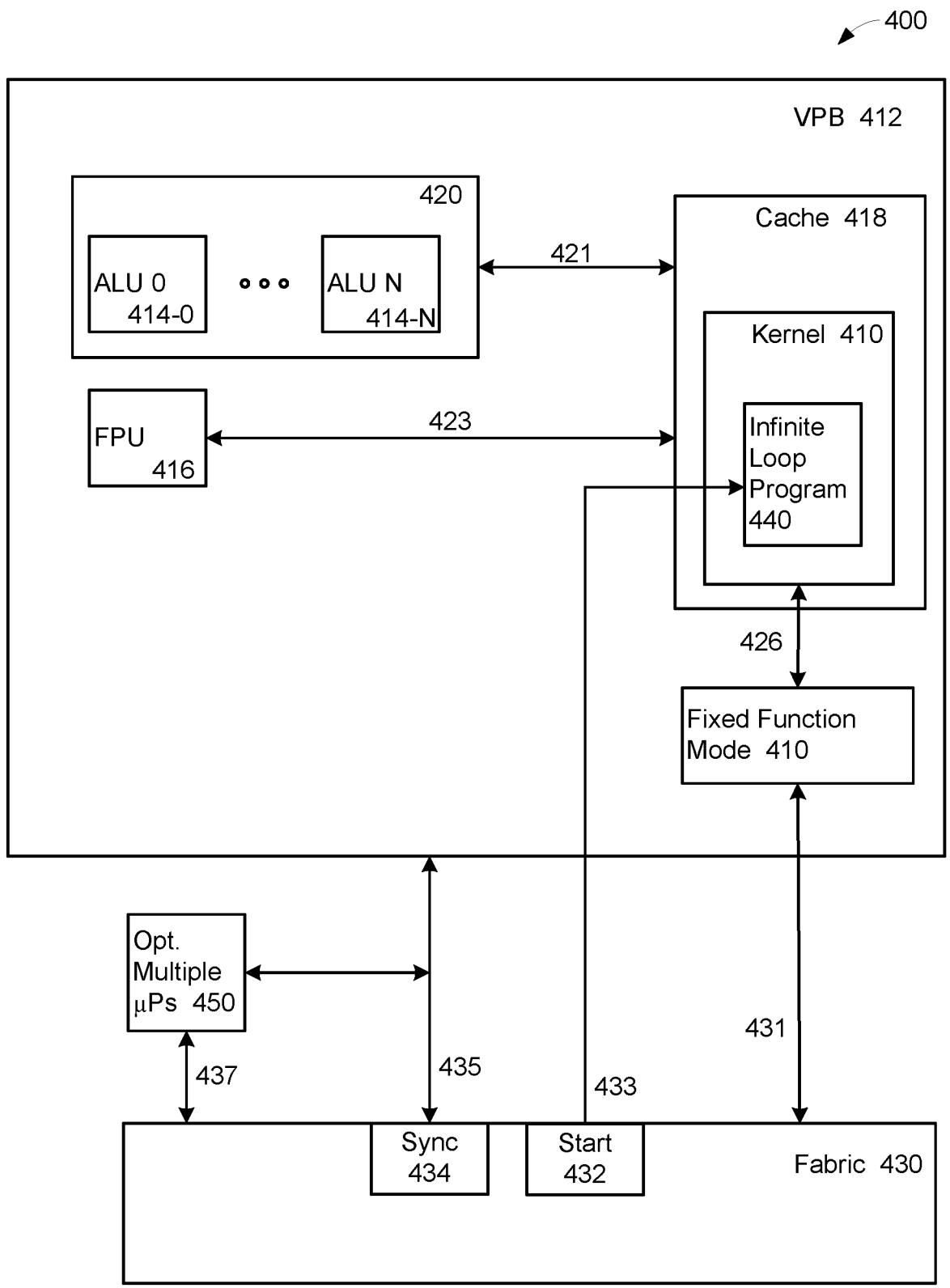
FIG. 4 depicts an example VPB logic fabric connection.

FIG. 4 depicts, generally at 400, an example implementation. At 412 is a VPB having one or more of an arithmetic logic unit (ALU) 420 shown as ALU 0 to ALU N 414-0 to 414-N, or a floating point unit (FPU) 416. A cache 418 is shown coupled via 421 or 423 with the one or more ALUs 420 or the FPU 416, respectively. It is noted that the cache 418 can be external of the ALUs 414 or the FPU 416 or disposed within the ALUs 414 or the FPU 416. The cache 418 has a Kernel 410 that is operable via link 426 in a fixed function mode 410. The fixed function mode 410, which emulates a fixed function, uses data streamed in from the fabric 430 via link 431. Kernel 410 has an infinite loop program 440 that receives a start control via link 433 from a start block 432 within fabric 430. VPB 410 receives via 435 a sync control 434 within fabric 430. Optionally, one or more microprocessors 450 that are connected to the fabric 430 via 437 receive a sync via 435 from sync 434 within fabric 430. This way the optional microprocessors can be synchronized.

Figure 5:
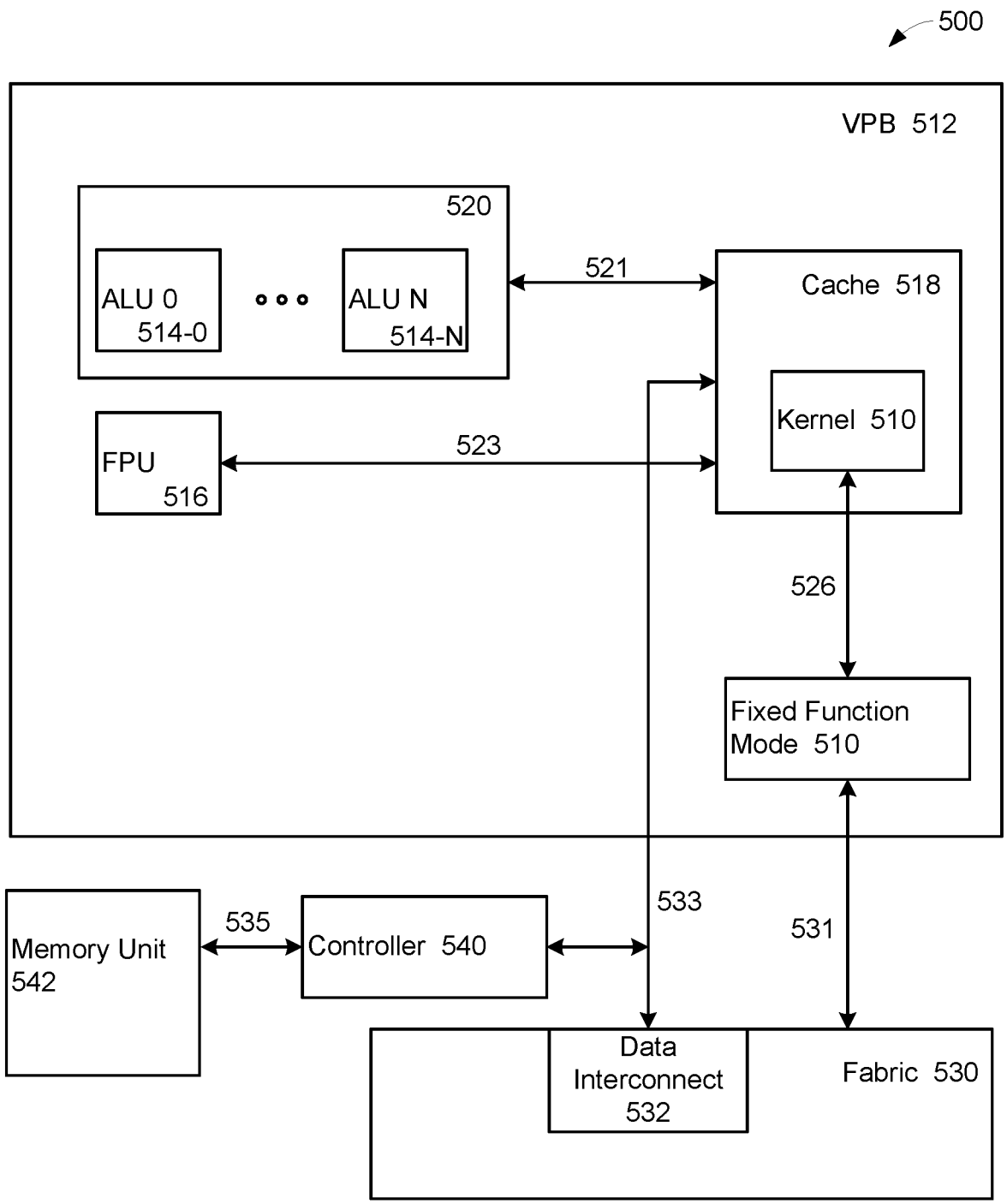
FIG. 5 depicts an example VPB, logic fabric, and controller connection.

FIG. 5 depicts, generally at 500, an example implementation. At 512 is a VPB having one or more of an arithmetic logic unit (ALU) 520 shown as ALU 0 to ALU N 514-0 to 514-N, or a floating point unit (FPU) 516. A cache 518 is shown operable via 521 or 523 with the one or more ALUs 520 or the FPU 516 respectively. It is noted that the cache 518 can be external to the ALUs 514 or the FPU 516 or disposed within the ALUs 514 or the FPU 516. The cache 518 has a Kernel 510 that is operable via link 526 in fixed function mode 510. The fixed function mode 510, which emulates a fixed function uses data streamed in from the fabric 530 via link 531. At 532 is a data interconnect in fabric 530. Via link 533 the data interconnect 532 transfers data signals between the fabric 530 and the cache 518. At 540 is a controller which via link 533 is operable with data interconnect 532, and via link 535 with memory unit 542.

Figure 6:
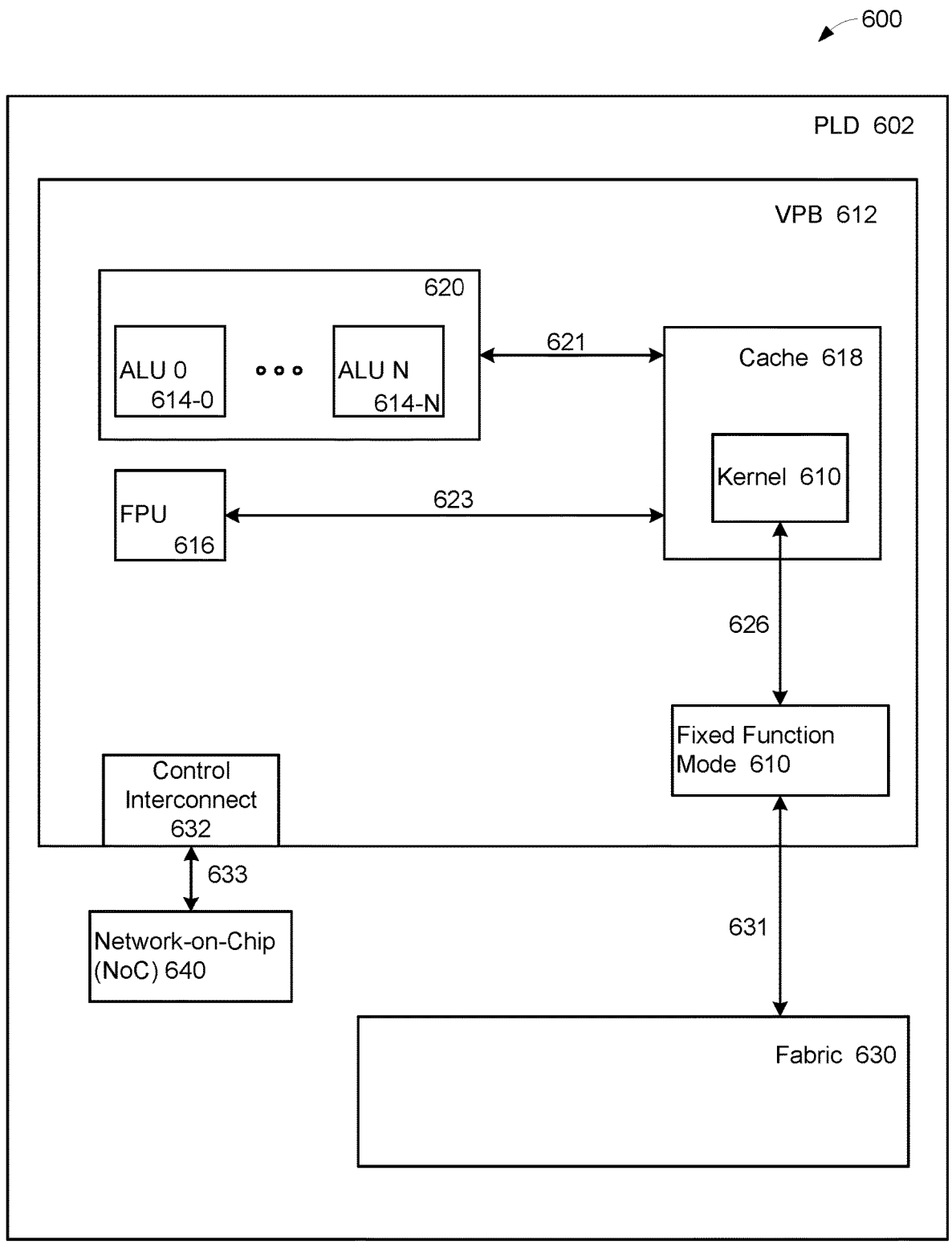
FIG. 6 depicts an example VPB network-on-chip (NoC) connection.

FIG. 6 depicts, generally at 600, an example implementation. At 602 is the PLD. At 612 is a VPB having one or more of an arithmetic logic unit (ALU) 620 shown as ALU 0 to ALU N 614-0 to 614-N, or a floating point unit (FPU) 616. A cache 618 is shown operable via 621 or 623 with the one or more ALUs 620 or the FPU 616 respectively. It is noted that the cache 618 can be external of the ALUs 614 or the FPU 616 or disposed within the ALUs 614 or the FPU 616. The cache 618 has a Kernel 610 that is operable via link 626 in fixed function mode 610. The fixed function mode 610, which emulates a fixed function uses data streamed in from the fabric 630 via link 631. At 632 is a control interconnect which via link 633 exchanges control signals between the VPB 612 and a network-on-chip (NoC) 640 of the PLD 602.

Figure 7:
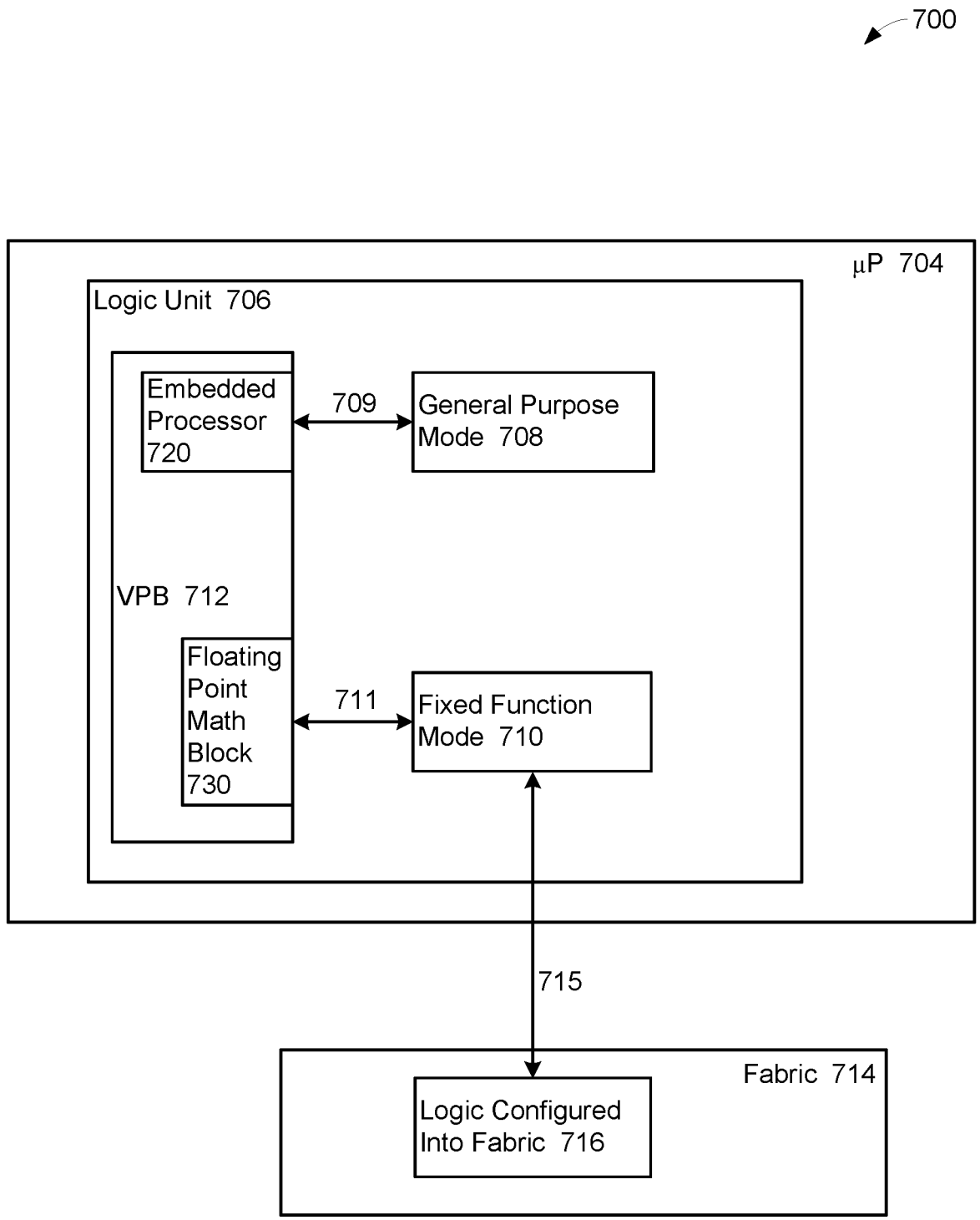
FIG. 7 depicts an example VPB fixed function mode fabric connection.

FIG. 7 depicts, generally at 700, an example implementation. At 704 is a microprocessor (µP) having a logic unit 706 which has a vector processor block 712, a general purpose mode 708, and a fixed function mode 710. The VPB 712 is operable as an embedded processor 720 via link 709 in the general purpose mode 708. The VPB 712 is operable as a floating point math block 730 via link 711 in the fixed function mode 710. Via link 715 the fixed function mode 710 is operable with the logic configured into fabric 716 which is part of fabric 714.

Figure 8:
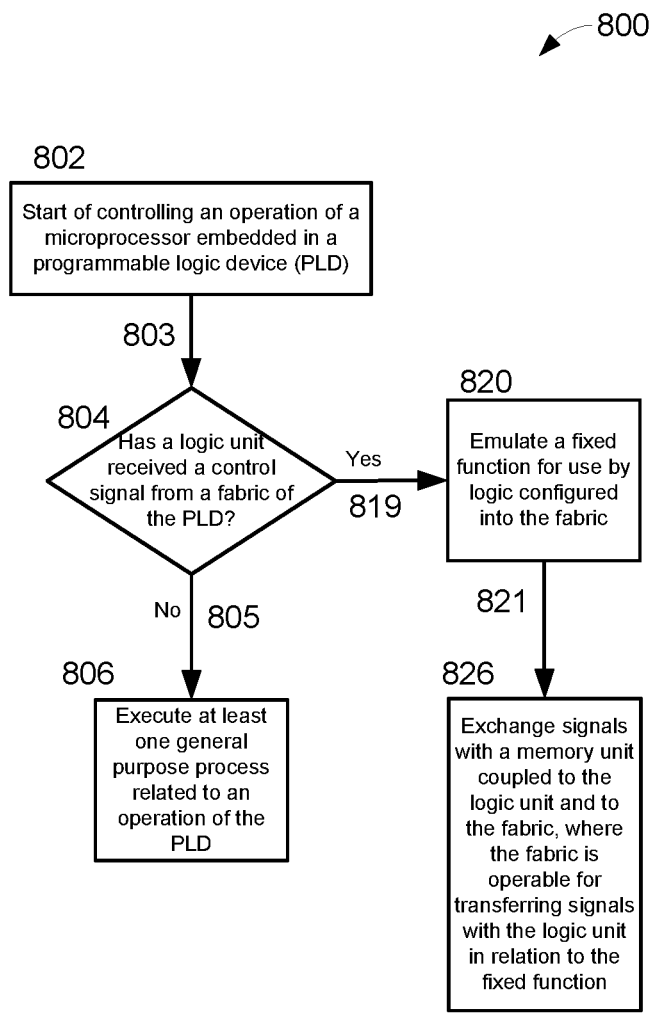
FIG. 8 depicts an example flow chart of a method.

FIG. 8 depicts, generally at 800, an example flow chart of a method. At 802 is a start of controlling an operation of a microprocessor embedded in a PLD, which proceeds via link 803 to a decision at 804. At 804 a determination is made if a logic unit in the PLD received a control signal from a fabric of the PLD, and when so (Yes) proceed via link 819 to block 820. If at 804 a determination is made that the logic unit has not received the control signal from the fabric of the PLD (No) then proceed via link 805 to block 806. At block 806 execute at least one general purpose process related to an operation of the PLD. At block 820 emulate a fixed function for use by logic configured into the fabric, then proceed via line 821 to block 822. At block 822 exchange signals with a memory unit coupled to the logic unit and to the fabric, where the fabric transfers signals with the logic unit in relation to the fixed function.

Figure 9:
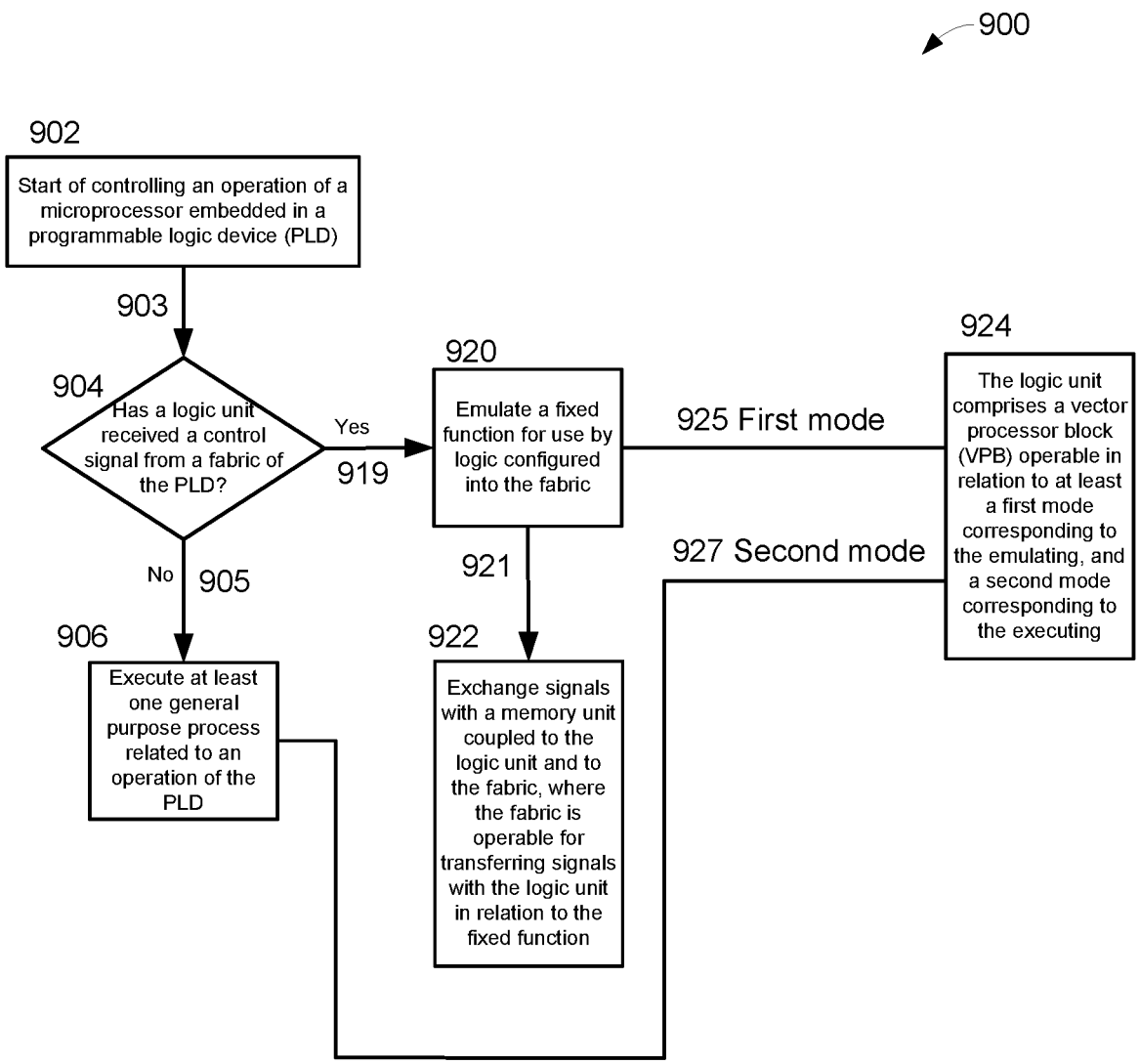
FIG. 9 depicts another example flow chart of a method.

FIG. 9 depicts, generally at 900, an example flow chart of a method. At 902 is a start of controlling an operation of a microprocessor embedded in a PLD, which proceeds via link 903 to a decision at 904. At 904 a determination is made if a logic unit of the PLD received a control signal from a fabric of the PLD, and when so (Yes) proceed via link 919 to block 920. If at 904 a determination is made that the logic unit has not received the control signal from the fabric of the PLD (No) then proceed via link 905 to block 906. At block 906 execute at least one general purpose process related to an operation of the PLD. At block 920 emulate a fixed function for use by logic configured into the fabric of the PLD, then proceed via line 921 to block 922. At block 922 exchange signals with a memory unit coupled to the logic unit and to the fabric, where the fabric transfers signals with the logic unit in relation to the fixed function. Block 924 has a logic unit that comprises a VPB operable in at least a first mode corresponding to the emulating, and a second mode corresponding to the executing. Via link 925 the first mode is operable with emulating block 920. Via link 927 the second mode is operable with executing block 906.

Figure 10:
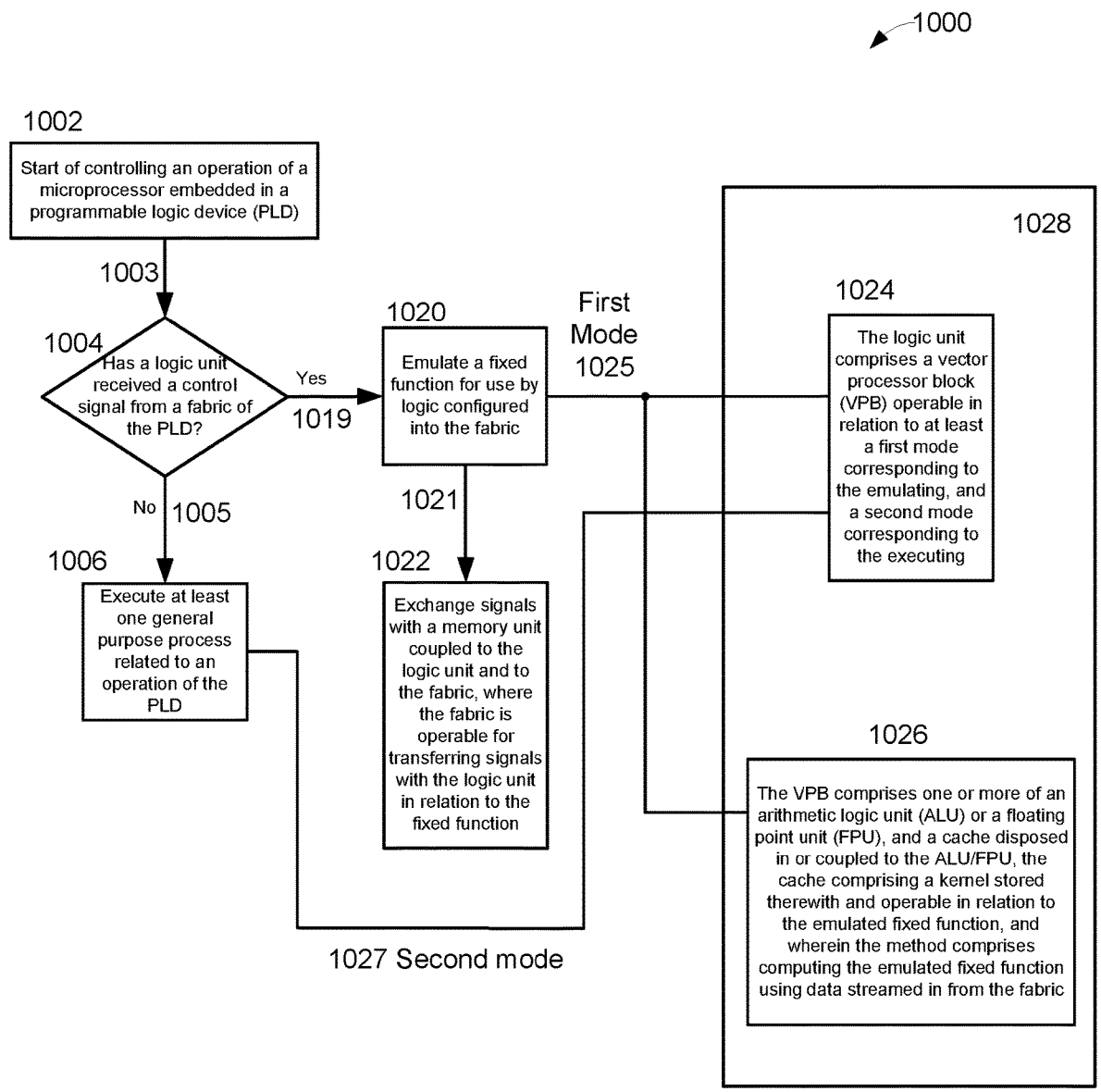
FIG. 10 depicts an example flow chart showing modes in more detail.

FIG. 10 depicts, generally at 1000, an example flow chart of a method. At 1002 is a start of controlling an operation of a microprocessor embedded in a PLD, which proceeds via link 1003 to a decision at 1004. At 1004 a determination is made if a logic unit of the PLD received a control signal from a fabric of the PLD, and when so (Yes) proceed via link 1019 to block 1020. If at 1004 a determination is made that the logic unit has not received the control signal from the fabric of the PLD (No) then proceed via link 1005 to block 1006. At block 1006 execute at least one general purpose process related to an operation of the PLD. At block 1020 emulate a fixed function for use by logic configured into the fabric, then proceed via line 1021 to block 1022. At block 1022 exchange signals with a memory unit coupled to the logic unit and to the fabric, where the fabric transfers signals with the logic unit in relation to the fixed function. Block 1028 has block 1024 and block 1026. Block 1024 has a logic unit that comprises a vector processor block (VPB) (more detail in block 1026) operable in relation to at least a first mode corresponding to the emulating, and a second mode corresponding to the executing. Via link 1025 the first mode is operable with emulating block 1020. Via link 1027 the second mode is operable with executing block 1006. Block 1026 details the VPB as comprising one or more of an arithmetic logic unit (ALU) or a floating point unit (FPU), and a cache disposed in or coupled to the ALU/FPU, the cache comprising a kernel stored therewith and operable in relation to the emulated fixed function (via link 1025 first mode), and wherein the method comprises computing the emulated fixed function using data streamed in from the fabric.

Figure 11:
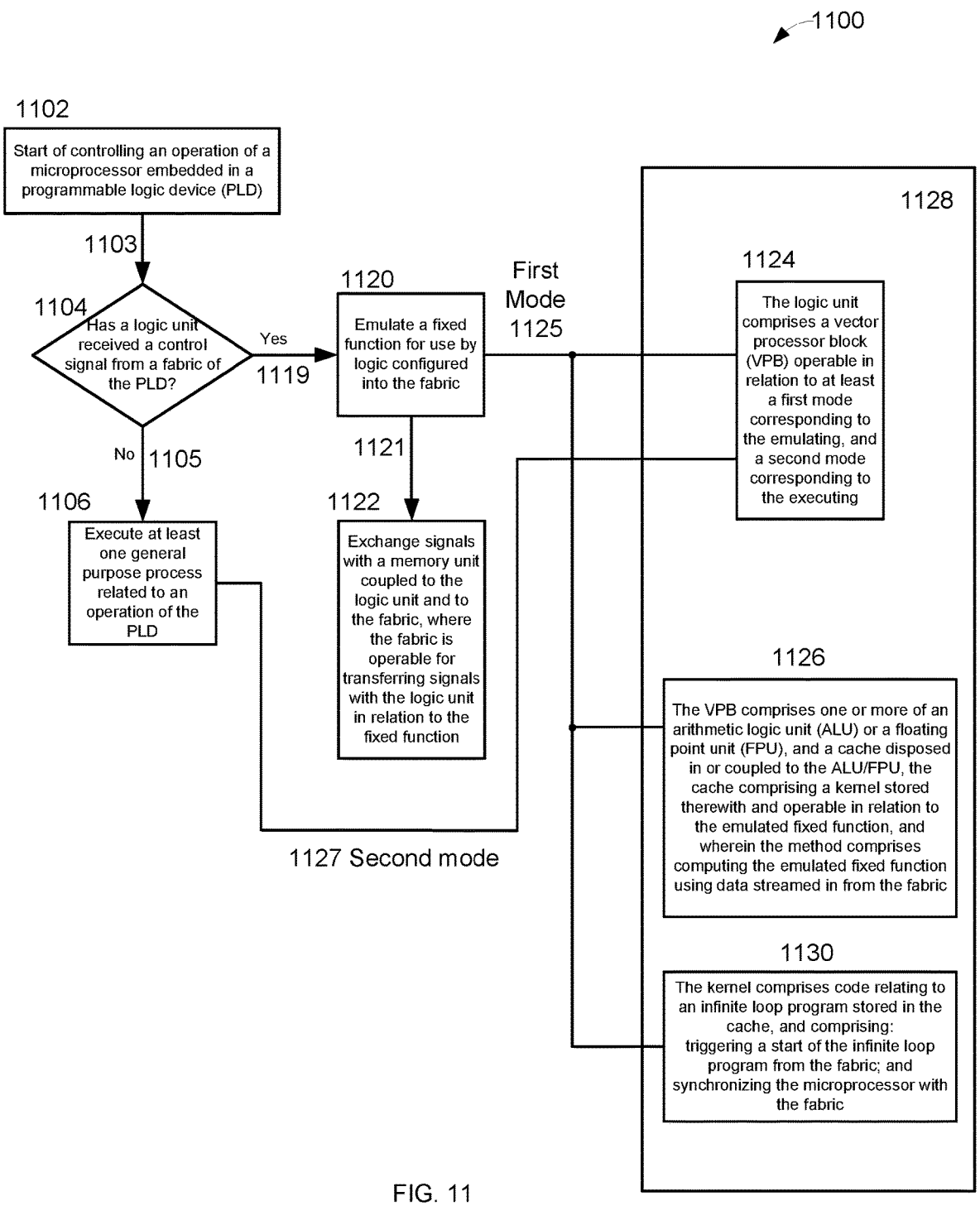
FIG. 11 depicts an example flow chart showing modes and a kernel.

FIG. 11 depicts, generally at 1100, an example flow chart of a method. At 1102 is a start of controlling an operation of a microprocessor embedded in a PLD, which proceeds via link 1103 to a decision at 1104. At 1104 a determination is made if a logic unit of the PLD received a control signal from a fabric of the PLD, and when so (Yes) proceed via link 1119 to block 1120. If at 1104 a determination is made that the logic unit of the PLD has not received the control signal from the fabric of the PLD (No) then proceed via link 1105 to block 1106. At block 1106 execute at least one general purpose process related to an operation of the PLD. At block 1120 emulate a fixed function for use by logic configured into the fabric, then proceed via line 1121 to block 1122. At block 1122 exchange signals with a memory unit coupled to the logic unit and to the fabric, where the fabric transfers signals with the logic unit in relation to the fixed function. Block 1128 has block 1124, block 1126, and block 1130. Block 1124 has a logic unit that comprises a VPB (more detail in block 1126) operable in at least a first mode corresponding to the emulating, and a second mode corresponding to the executing. Via link 1125 the first mode is operable with emulating block 1120. Via link 1127 the second mode is operable with executing block 1106. Block 1126 details the VPB as comprising one or more of an arithmetic logic unit (ALU) or a floating point unit (FPU), and a cache (more detail in block 1130) disposed in or coupled to the ALU/FPU, the cache comprising a kernel stored therewith and operable in relation to the emulated fixed function (via link 1125 first mode), and wherein the method comprises computing the emulated fixed function using data streamed in from the fabric. Block 1130 has additional details where the kernel comprises code relating to an infinite loop program stored in the cache, and comprising triggering a start of the infinite loop program from the fabric, and synchronizing the microprocessor with the fabric.

Figure 12:
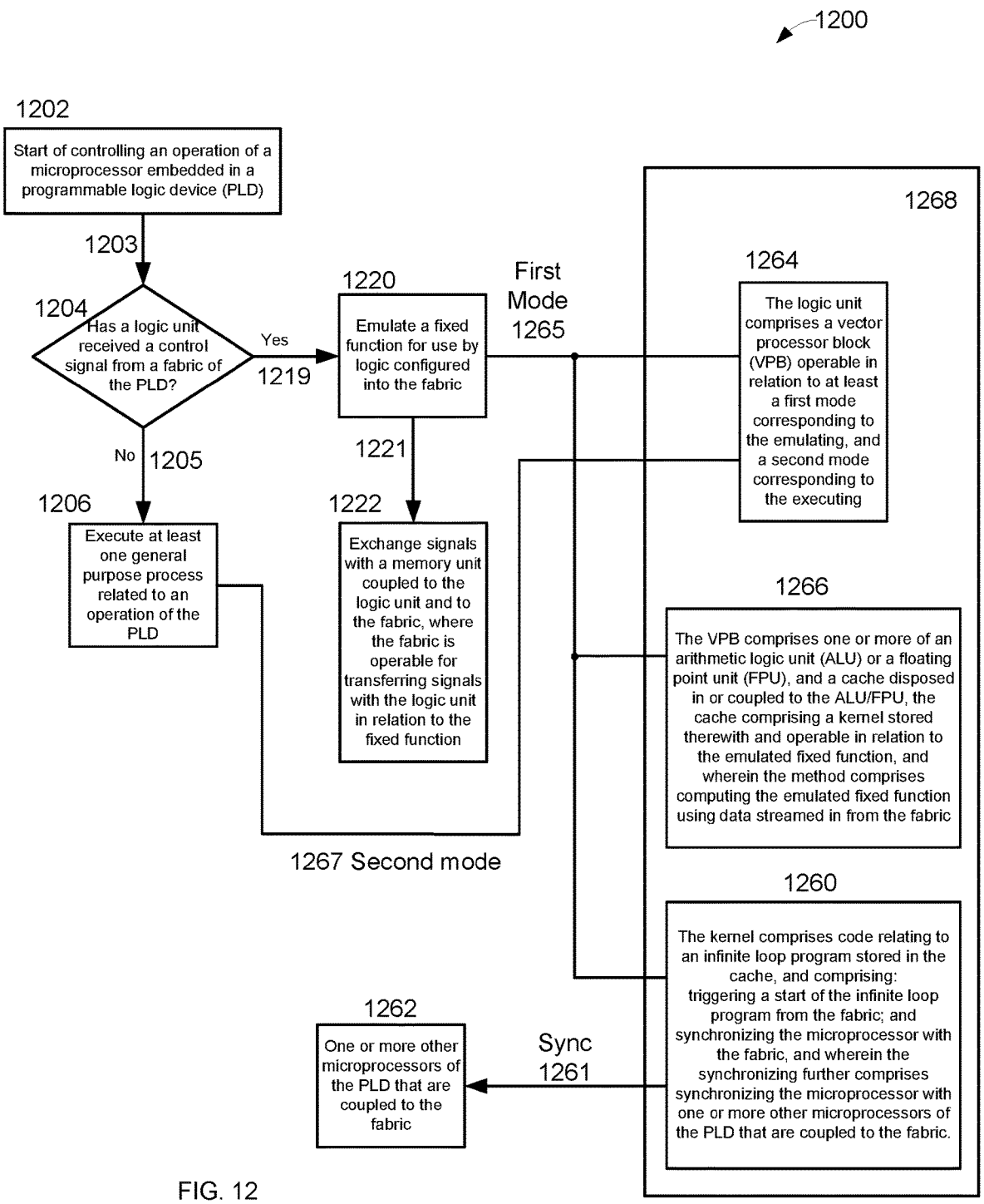
FIG. 12 depicts an example flow chart showing synchronization.

FIG. 12 depicts, generally at 1200, an example flow chart of a method. At 1202 is a start of controlling an operation of a microprocessor embedded in a PLD, which proceeds via link 1203 to a decision at 1204. At 1204 a determination is made if a logic unit of the PLD received a control signal from a fabric of the PLD, and when so (Yes) proceed via link 1219 to block 1220. If at 1204 a determination is made that the logic unit of the PLD has not received the control signal from the fabric of the PLD (No) then proceed via link 1205 to block 1206. At block 1206 execute at least one general purpose process related to an operation of the PLD. At block 1220 emulate a fixed function for use by logic configured into the fabric, then proceed via line 1221 to block 1222. At block 1222 exchange signals with a memory unit coupled to the logic unit and to the fabric, where the fabric transfers signals with the logic unit in relation to the fixed function. Block 1268 has block 1264, block 1266, and block 1260. Block 1264 has a logic unit that comprises a VPB (more detail in block 1266) operable in relation to at least a first mode corresponding to the emulating, and a second mode corresponding to the executing. Via link 1265 the first mode is operable with emulating block 1220. Via link 1267 the second mode is operable with executing block 1206. Block 1266 details the VPB as comprising one or more of an ALU or an FPU, and a cache (more detail in block 1260) disposed in or coupled to the ALU/FPU, the cache comprising a kernel stored therewith and operable in relation to the emulated fixed function (via link 1265 first mode), and wherein the method comprises computing the emulated fixed function using data streamed in from the fabric. Block 1260 has additional details where the kernel comprises code relating to an infinite loop program stored in the cache, and triggering a start of the infinite loop program from the fabric, and synchronizing the microprocessor with the fabric, and where the synchronizing further comprises synchronizing the microprocessor with one or more other microprocessors of the PLD that are coupled to the fabric as shown via link 1261 sync to 1262 having one or more other microprocessors of the PLD that are coupled to the fabric.

Figure 13:
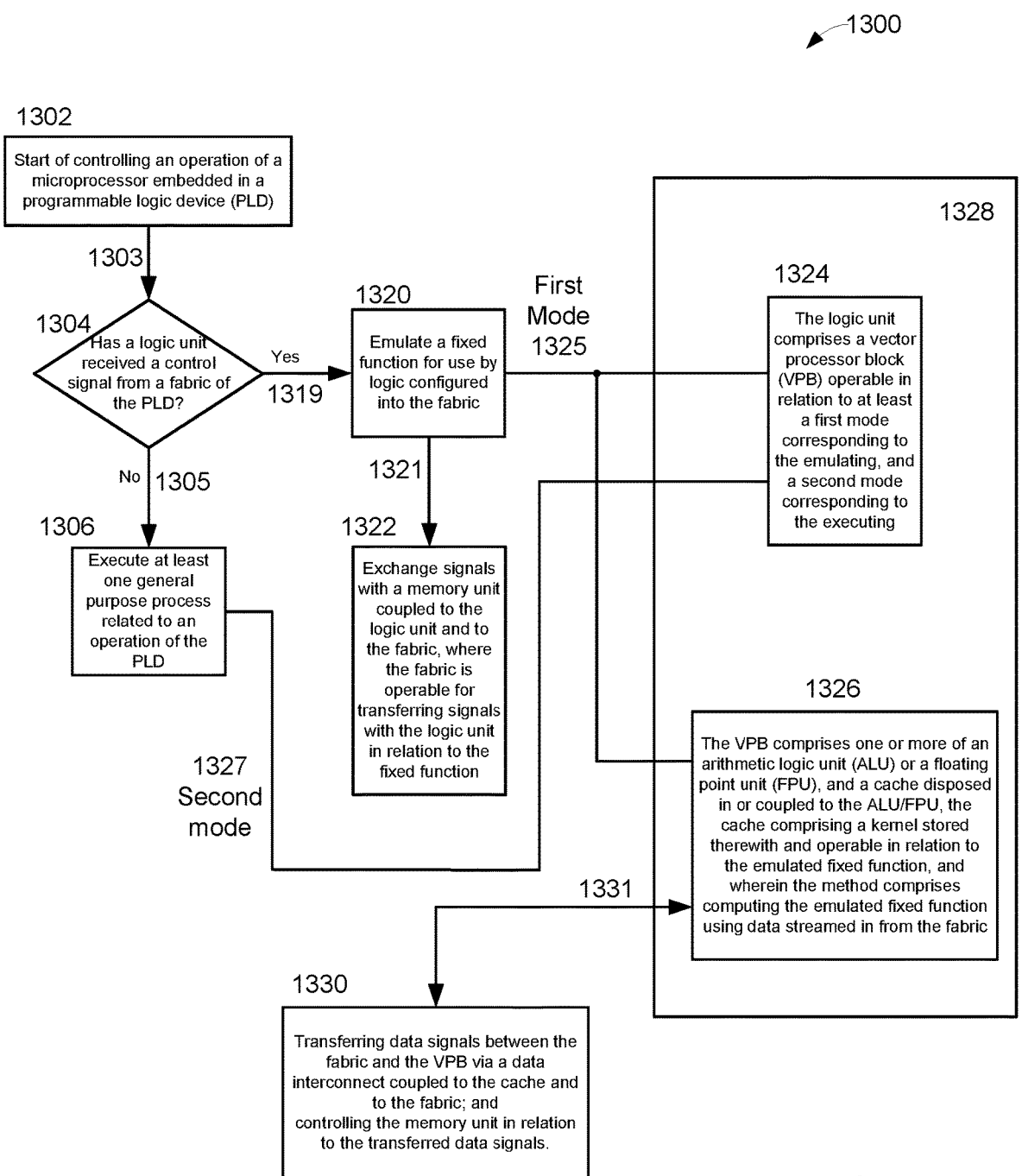
FIG. 13 depicts an example flow chart showing a data interconnection.

FIG. 13 depicts, generally at 1300, an example flow chart of a method. At 1302 is a start of controlling an operation of a microprocessor embedded in a PLD, which proceeds via link 1303 to a decision at 1304. At 1304 a determination is made if a logic unit of the PLD received a control signal from a fabric of the PLD, and when so (Yes) proceed via link 1319 to block 1320. If at 1304 a determination is made that the logic unit has not received the control signal from the fabric of the PLD (No) then proceed via link 1305 to block 1306. At block 1306 execute at least one general purpose process related to an operation of the PLD. At block 1320 emulate a fixed function for use by logic configured into the fabric, then proceed via line 1321 to block 1322. At block 1322 exchange signals with a memory unit coupled to the logic unit and to the fabric, where the fabric transfers signals with the logic unit in relation to the fixed function. Block 1328 has block 1324 and block 1326. Block 1324 has a logic unit that comprises a VPB (more detail in block 1326) operable in relation to at least a first mode corresponding to the emulating, and a second mode corresponding to the executing. Via link 1325 the first mode is operable with emulating block 1320. Via link 1327 the second mode is operable with executing block 1306. Block 1326 details the VPB as comprising one or more of an ALU or an FPU, and a cache disposed in or coupled to the ALU/FPU, the cache comprising a kernel stored therewith and operable in relation to the emulated fixed function (via link 1325 first mode), and wherein the method comprises computing the emulated fixed function using data streamed in from the fabric. Block 1330 via link 1331 to block 1326 transfers data signals between the fabric and the VPB via a data interconnect coupled to the cache and to the fabric, and controls the memory unit in relation to the transferred data signals.

Figure 14:
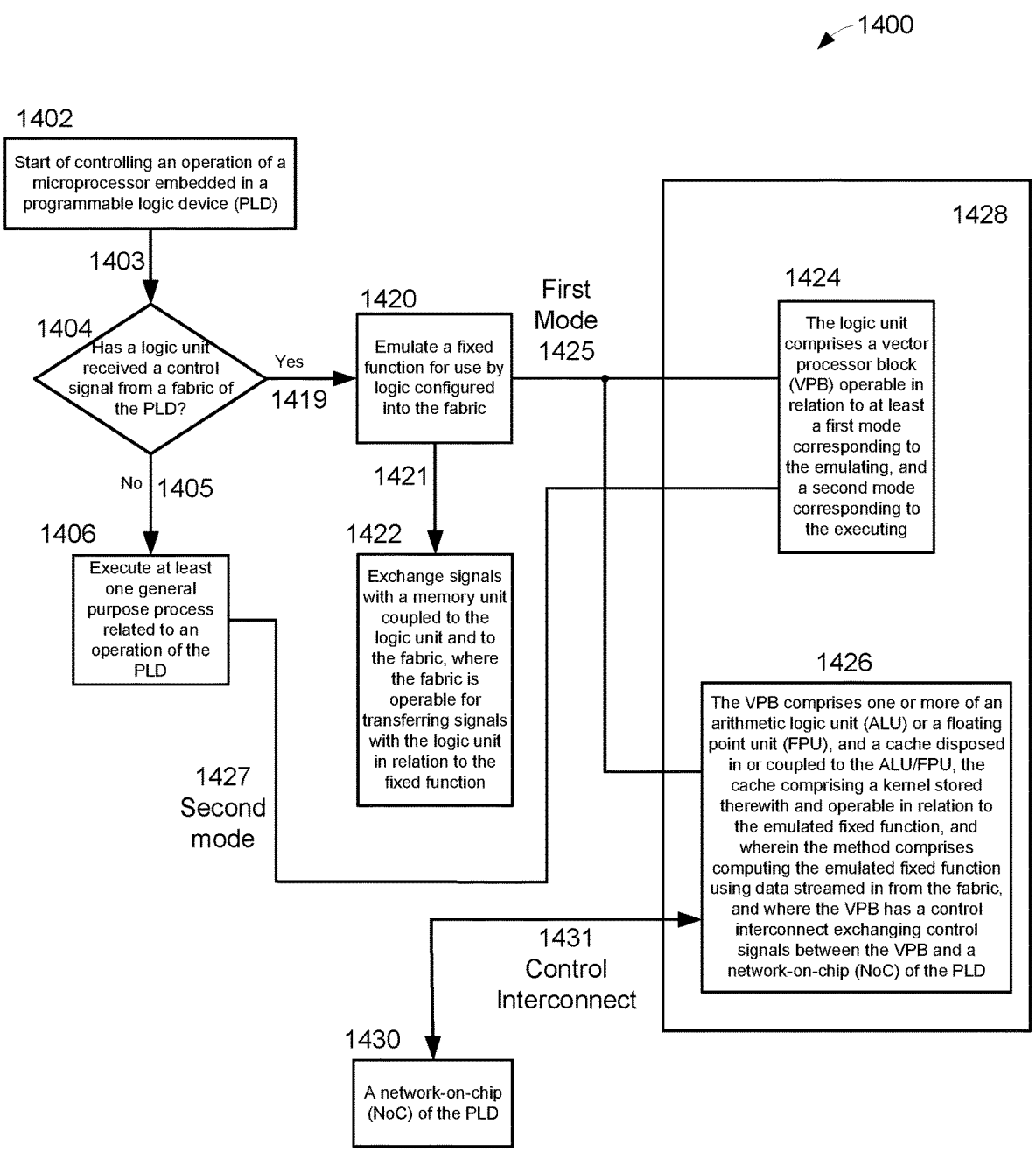
FIG. 14 depicts an example flow chart showing a network-on-chip (NoC).

FIG. 14 depicts, generally at 1400, an example flow chart of a method. At 1402 is a start of controlling an operation of a microprocessor embedded in a PLD, which proceeds via link 1403 to a decision at 1404. At 1404 a determination is made if a logic unit of the PLD received a control signal from a fabric of the PLD, and when so (Yes) proceed via link 1419 to block 1420. If at 1404 a determination is made that the logic unit of the PLD has not received the control signal from the fabric of the PLD (No) then proceed via link 1405 to block 1406. At block 1406 execute at least one general purpose process related to an operation of the PLD. At block 1420 emulate a fixed function for use by logic configured into the fabric, then proceed via line 1421 to block 1422. At block 1422 exchange signals with a memory unit coupled to the logic unit and to the fabric, where the fabric is operable to transfer signals with the logic unit in relation to the fixed function. Block 1428 has block 1424 and block 1426. Block 1424 has a logic unit that comprises a VPB (more detail in block 1426) operable in relation to at least a first mode corresponding to the emulating, and a second mode corresponding to the executing. Via link 1425 the first mode is operable with emulating block 1420. Via link 1427 the second mode is operable with executing block 1406. Block 1426 details the VPB comprises one or more of an ALU or an FPU, and a cache disposed in or coupled to the ALU/FPU, the cache comprising a kernel stored therewith and operable in relation to the emulated fixed function, and wherein the method comprises computing the emulated fixed function using data streamed in from the fabric, and where the VPB has a control interconnect exchanging control signals between the VPB and a network-on-chip (NoC) of the PLD via link 1431 control interconnect to block 1430 having a network-on-chip (NoC) of the PLD.

Figure 15:
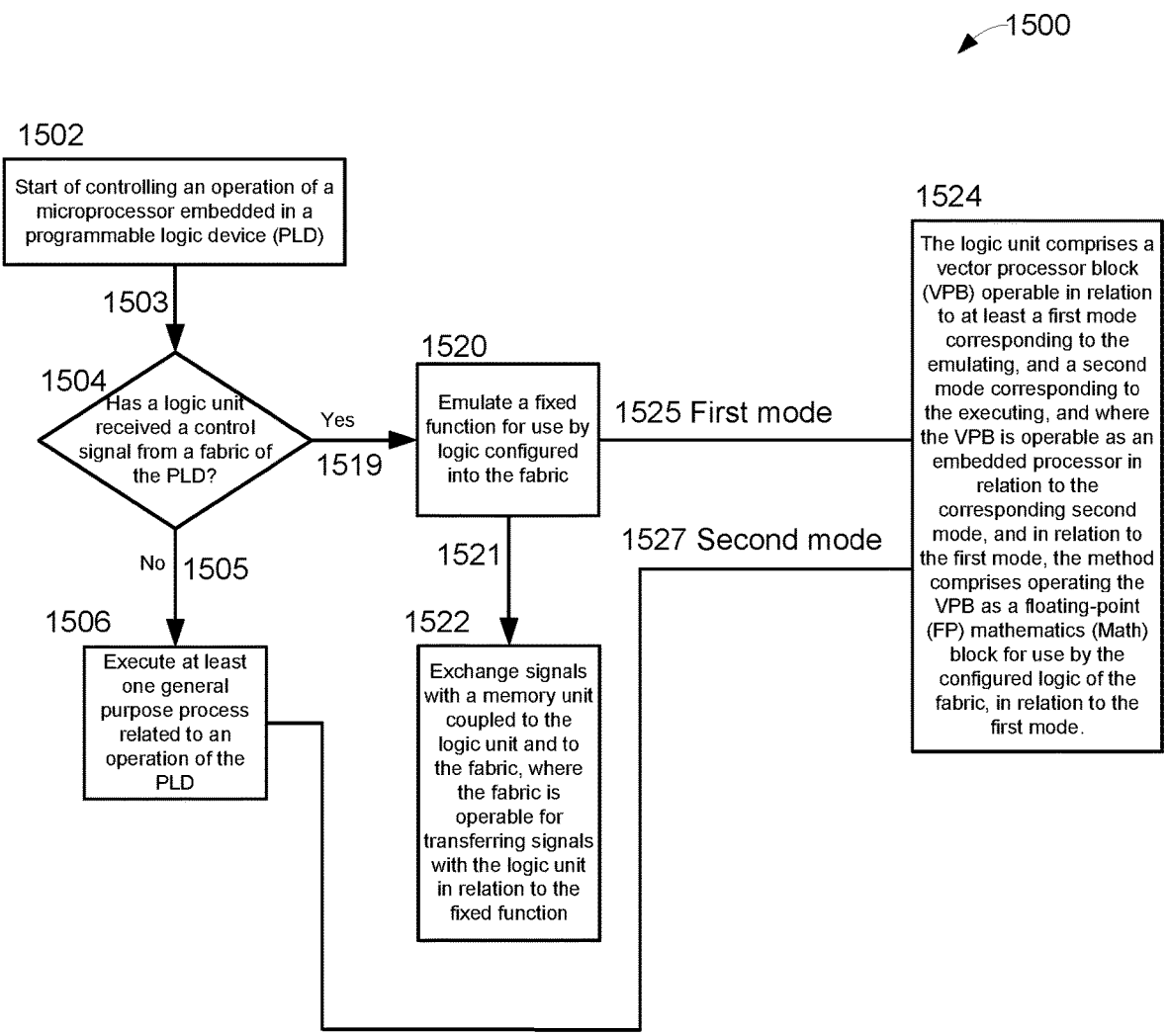
FIG. 15 depicts an example flow chart showing a math block.

FIG. 15 depicts, generally at 1500, an example flow chart of a method. At 1502 is a start of controlling an operation of a microprocessor embedded in a PLD, which proceeds via link 1503 to a decision at 1504. At 1504 a determination is made if a logic unit of the PLD received a control signal from a fabric of the PLD, and when so (Yes) proceed via link 1519 to block 1520. If at 1504 a determination is made that the logic unit of the PLD has not received the control signal from the fabric of the PLD (No) then proceed via link 1505 to block 1506. At block 1506 execute at least one general purpose process related to an operation of the PLD. At block 1520 emulate a fixed function for use by logic configured into the fabric, then proceed via line 1521 to block 1522. At block 1522 exchange signals with a memory unit coupled to the logic unit and to the fabric, where the fabric transfers signals with the logic unit in relation to the fixed function. Block 1524 has a logic unit that comprises a vector processor block (VPB) operable in relation to at least a first mode corresponding to the emulating, and a second mode corresponding to the executing, and where the VPB is operable as an embedded processor in relation to the corresponding second mode, and in relation to the first mode, the method comprises operating the VPB as a floating-point (FP) mathematics (Math) block for use by the configured logic of the fabric, in relation to the first mode. Via link 1525 the first mode is operable with emulating block 1520. Via link 1527 the second mode is operable with executing block 1506.

Figure 16:
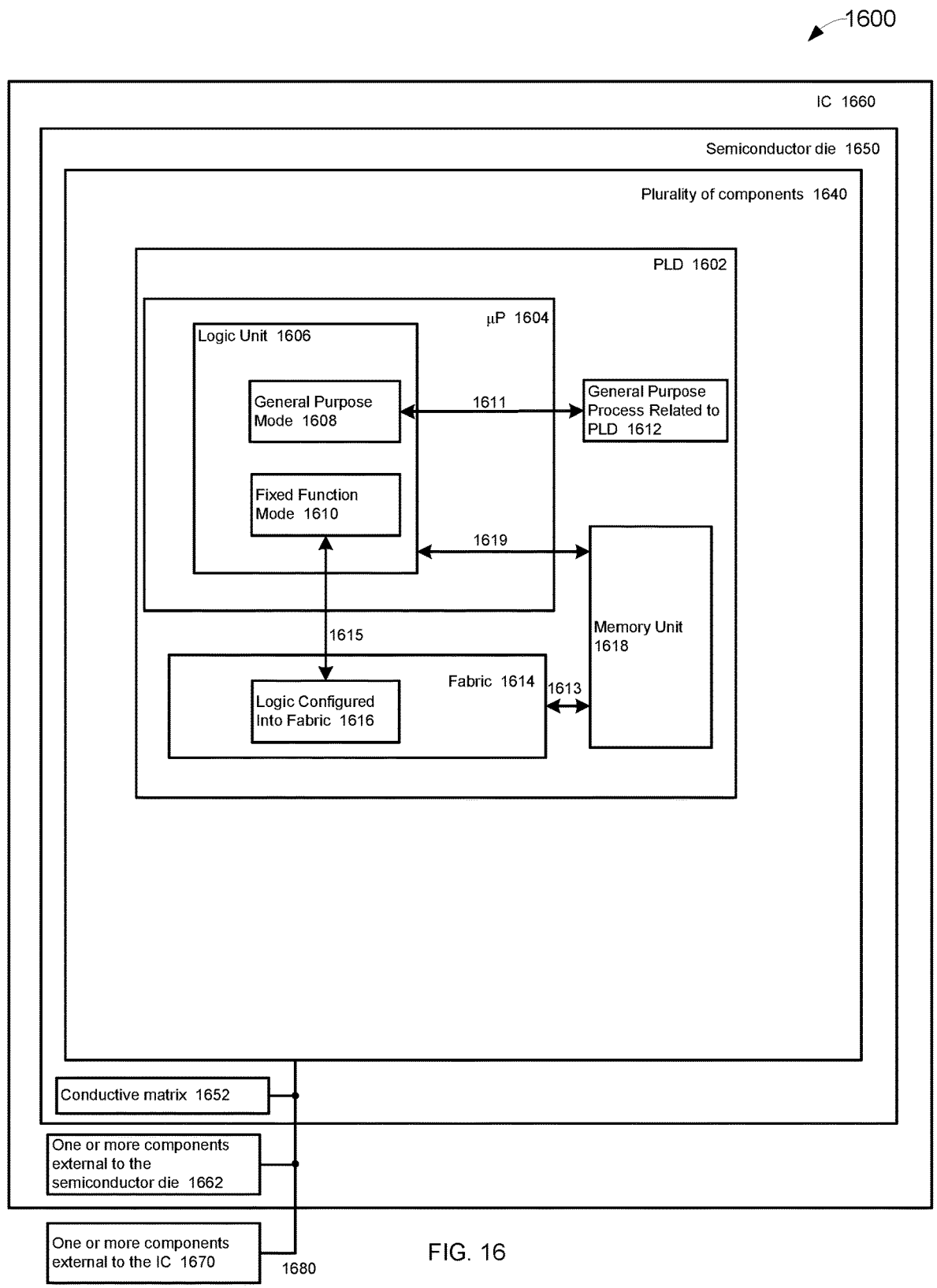
FIG. 16 depicts an example integrated circuit (IC).

FIG. 16 depicts, generally at 1600, an example implementation. At 1660 is an integrated circuit (IC), having a semiconductor die 1650 with a plurality of components 1640 including a PLD 1602. PLD 1602 has at 1604 a microprocessor (μP), a fabric 1614 and a memory unit 1618. The microprocessor 1604 has a logic unit 1606 which has a general purpose mode 1608 and a fixed function mode 1610. Via link 1611 the general purpose mode 1608 is operable with a general purpose process 1612 related to the PLD 1602. Via link 1619 the logic unit 1606 is operable with the memory unit 1618. Fabric 1614 has logic configured into fabric 1616. Via link 1615 the fixed function mode 1610 is operable with the logic configured into fabric 1616. Via link 1613 fabric 1614 is operable with memory unit 1618. The semiconductor die 1650 has a conductive matrix 1652 for coupling the plurality of components 1640 and one or more components 1662 external to the semiconductor die 1650, and one or more components 1670 external to the IC 1660, via a representative link 1680.

Figure 17:
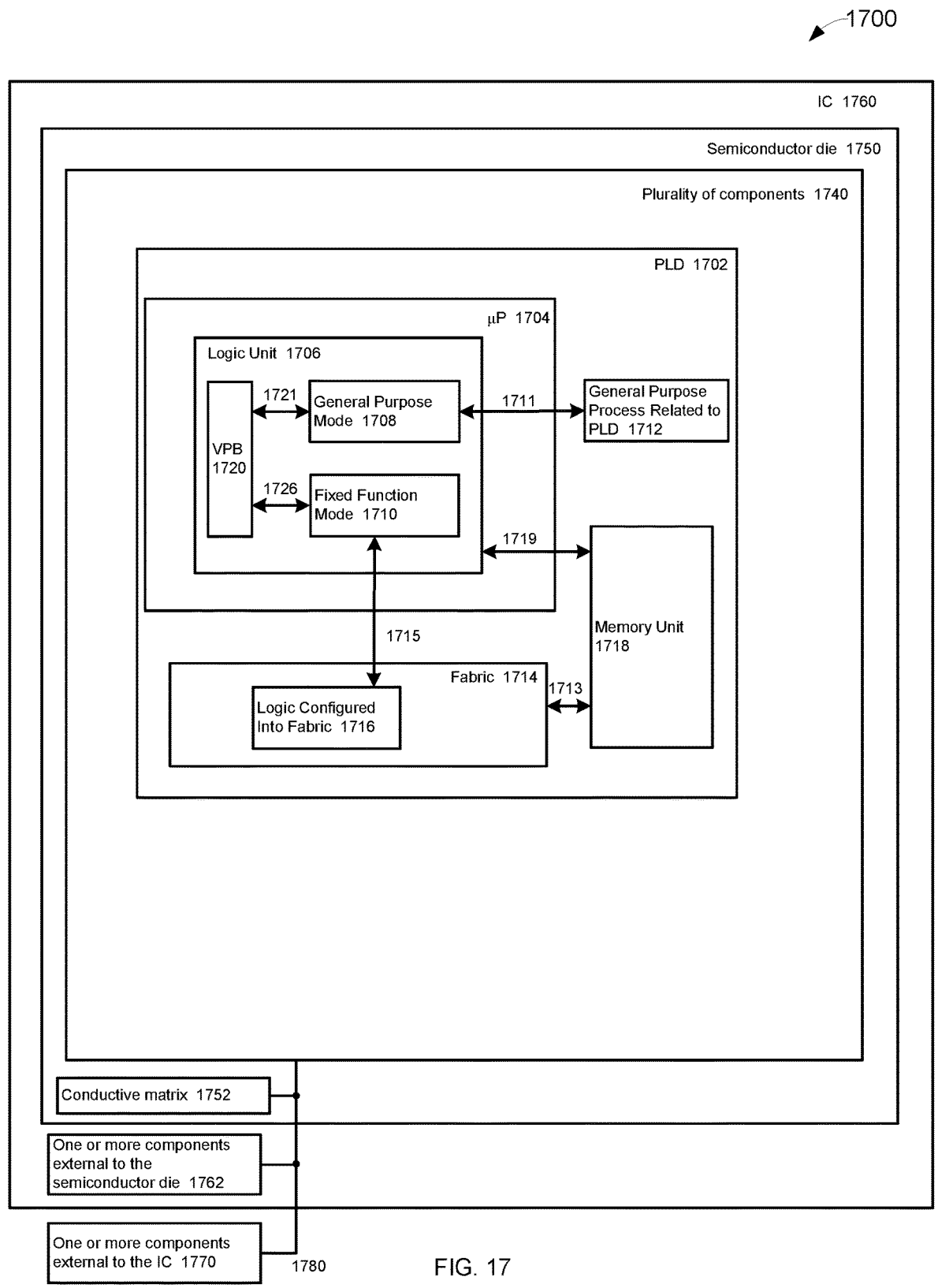
FIG. 17 depicts an example IC with a VPB.

FIG. 17 depicts, generally at 1700, an example implementation. At 1760 is an integrated circuit (IC), having a semiconductor die 1750 with a plurality of components 1740 including a PLD 1702. The PLD 1702 has at 1704 a microprocessor (μP), a fabric 1714 and a memory unit 1718. The microprocessor 1704 has a logic unit 1706 which has a vector processor block (VPB) 1720, a general purpose mode 1708 and a fixed function mode 1710. The VPB 1720 is operable via link 1721 with the general purpose mode 1708. The VPB 1720 is operable via link 1723 with the fixed function mode 1710. Via link 1711 the general purpose mode 1708 is operable with a general purpose process 1712 related to the PLD 1702. Via link 1719 the logic unit 1706 is operable with the memory unit 1718. Fabric 1714 has logic configured into fabric 1716. Via link 1715 the fixed function mode 1710 is operable with the logic configured into fabric 1716. Via link 1713 fabric 1714 is operable with memory unit 1718. The semiconductor die 1750 has a conductive matrix 1752 for coupling a plurality of components 1740 and one or more components 1762 external to the semiconductor die, and one or more components 1770 external to the IC, via a representative link 1780.

Figure 18:
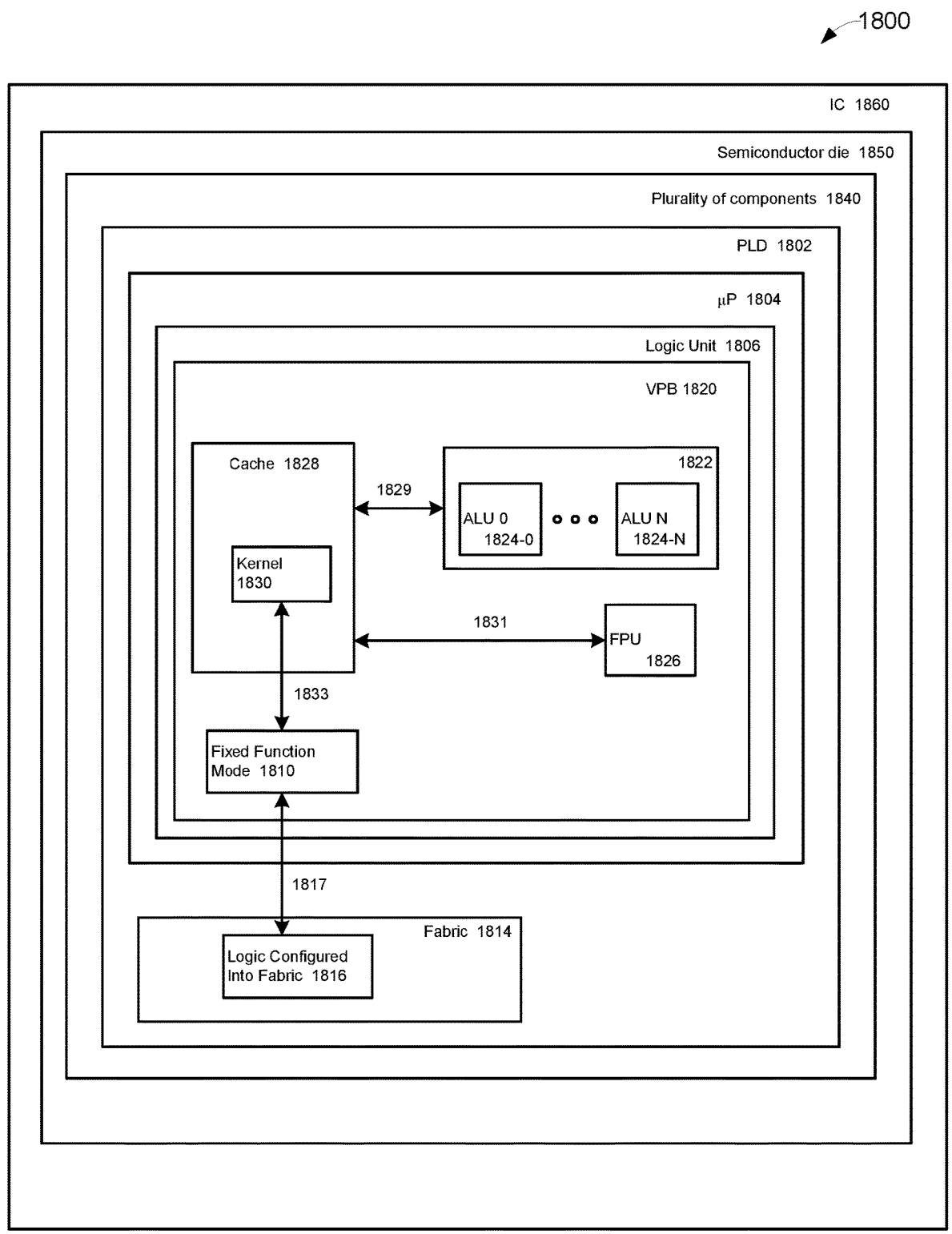
FIG. 18 depicts an example IC with a VPB in more detail.

FIG. 18 depicts, generally at 1800, an example implementation. At 1860 is an integrated circuit (IC), having a semiconductor die 1850 with a plurality of components 1840 including a PLD 1802. The PLD 1802 has at 1804 a microprocessor (μP), and at 1814 fabric. The microprocessor 1804 has a logic unit 1806 which has a vector processor block (VPB) 1820. The VPB 1820 has an ALU block 1822 which has one or more of an arithmetic logic unit (ALU) 1824 shown as ALU 0 to ALU N 1824-0 to 1824-N, or a floating point unit (FPU) 1826, and a cache 1828. Cache 1828 is shown operable via 1829 or 1831 with the one or more ALUs 1824 or the FPU 1826 respectively. It is noted that the cache 1828 can be external to the ALUs 1824 or the FPU 1826 or disposed within the ALUs 1824 or the FPU 1826. The cache 1828 has a Kernel 1830 that is operable via link 1833 with fixed function mode 1810. The fixed function mode 1810, which emulates a fixed function uses data streamed in, via link 1817, from the fabric 1814 from the logic configured into fabric 1816.

Figure 19:
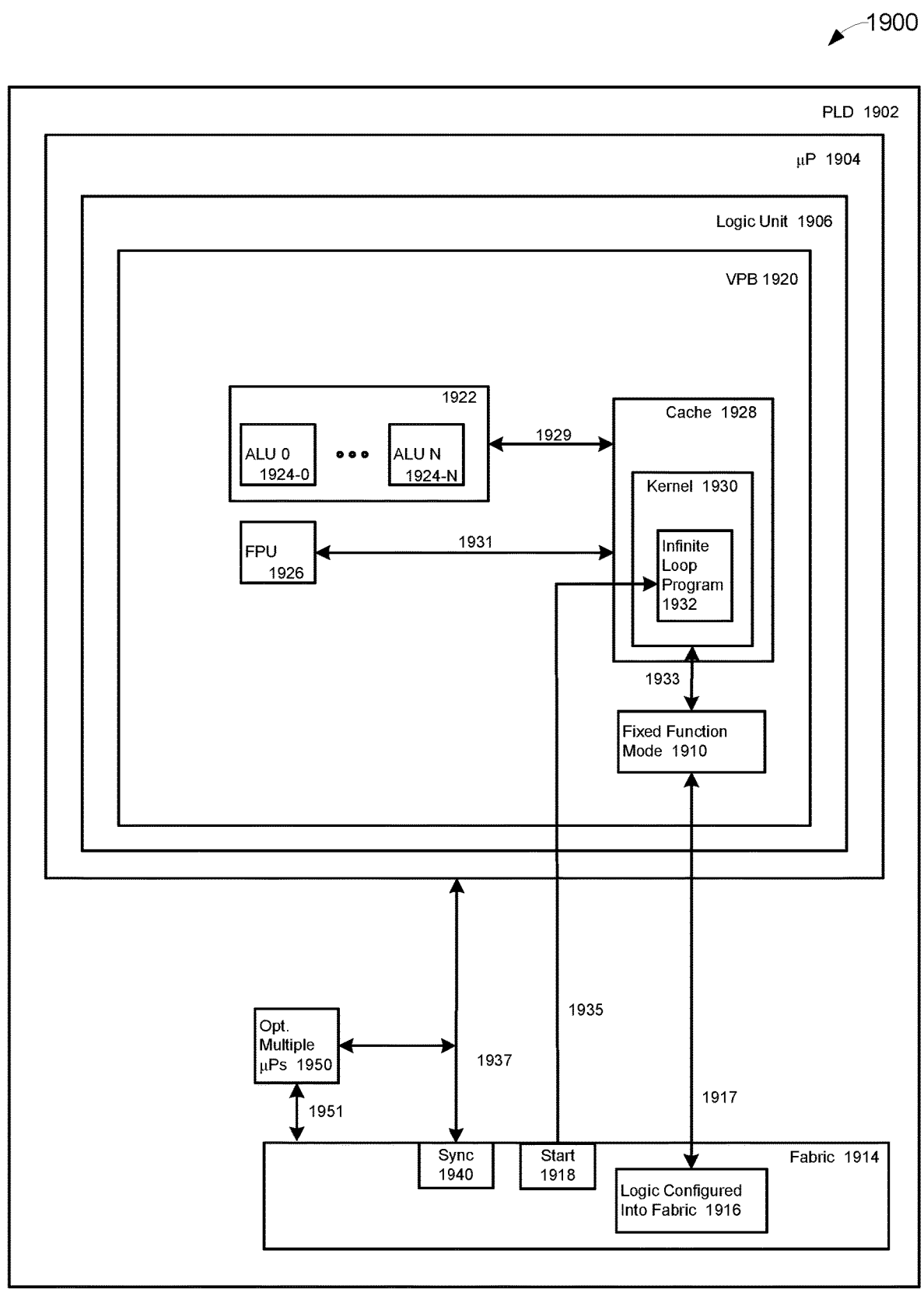
FIG. 19 depicts an example IC with a VPB in communication with fabric.

FIG. 19 depicts, generally at 1900, an example implementation. Not shown, is an integrated circuit (IC), having a semiconductor die, also not shown, with a plurality of components, also not shown, including a PLD 1902. The PLD 1902 has at 1904 a microprocessor (μP) having a logic unit 1906, which logic unit 1906 has a vector processor block (VPB) 1920. The VPB 1920 has one or more of an arithmetic logic unit (ALU) 1922 shown as ALU 0 to ALU N 1924-0 to 1924-N, or a floating point unit (FPU) 1926 and a cache 1928. The cache 1928 is shown operable via 1929 or 1931 with the one or more ALUs 1922 or the FPU 1926 respectively. It is noted that the cache 1928 can be external to the ALUs 1922 or the FPU 1926 or disposed within the ALUs 1922 or the FPU 1926. The cache 1928 has a Kernel 1930 that is operable via link 1933 with fixed function mode 1910. The fixed function mode 1910, which emulates a fixed function uses data streamed in, via link 1917, from the fabric 1914 from the logic configured into fabric 1916. Kernel 1930 has an infinite loop program 1932 that receives a start control via link 1935 from a start block 1918 within fabric 1914. VPB 1920 receives via 1937 a sync control 1940 from within fabric 1914. Optionally, one or more microprocessors 1950 that are connected to the fabric 1914 via 1951 receive a sync via 1937 from sync 1940 within fabric 1914. This way the optional microprocessors can be synchronized.

Figure 20:
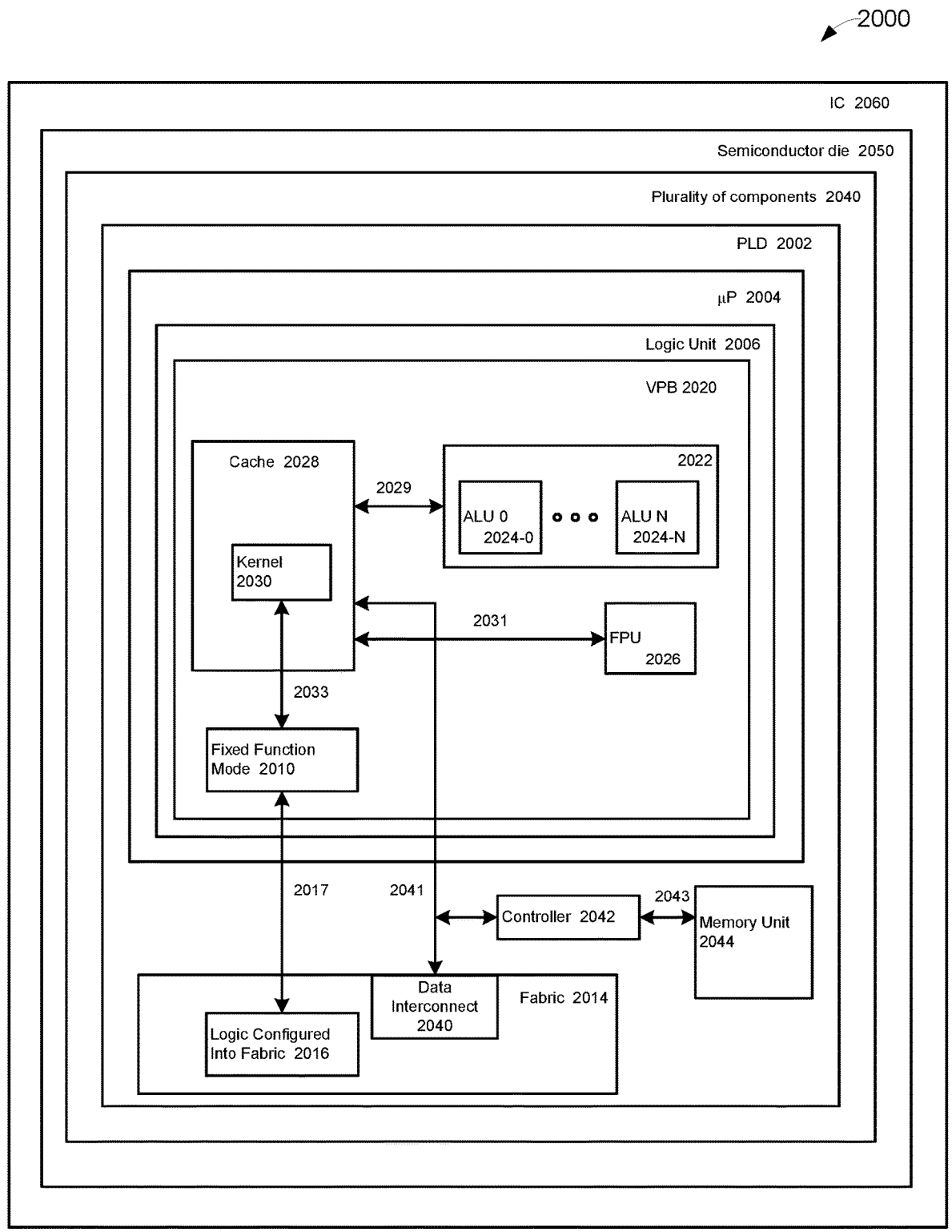
FIG. 20 depicts an example IC with a VPB in communication with a controller.

FIG. 20 depicts, generally at 2000, an example implementation. At 2060 is an integrated circuit (IC), having a semiconductor die 2050 with a plurality of components 2040 including a PLD 2002. The PLD 2002 has at 2004 a microprocessor (μP), at 2014 a fabric, at 2042 a controller and at 2044 a memory unit. The μP 2004 has a logic unit 2006 which logic unit 2006 has a vector processor block (VPB) 2020. The VPB 2020 has one or more of an arithmetic logic unit (ALU) 2022 shown as ALU 0 to ALU N 2022-0 to 2022-N, or a floating point unit (FPU) 2026. VPB 2020 has a cache 2028, which cache 2028 is shown operable via 2029 or 2031 with the one or more ALUs 2022 or the FPU 2026 respectively. It is noted that the cache 2028 can be external to the ALUs 2022 or the FPU 2026 or disposed within the ALUs 2022 or the FPU 2026. The cache 2028 has a Kernel 2030 that is operable via link 2033 in a fixed function mode 2010. The fixed function mode 2010, which emulates a fixed function uses data streamed in, via link 2017, from the fabric 2014 from the logic configured into fabric 2016. At 2040 is a data interconnect in fabric 2014. Via link 2041 the data interconnect 2040 is operable with the cache 2028 of the VPB 2020 to transfer data signals between the fabric 2014 and the cache 2028. At 2042 is a controller which via link 2041 is operable with data interconnect 2040, and via link 2043 with memory unit 2044.

Figure 21:
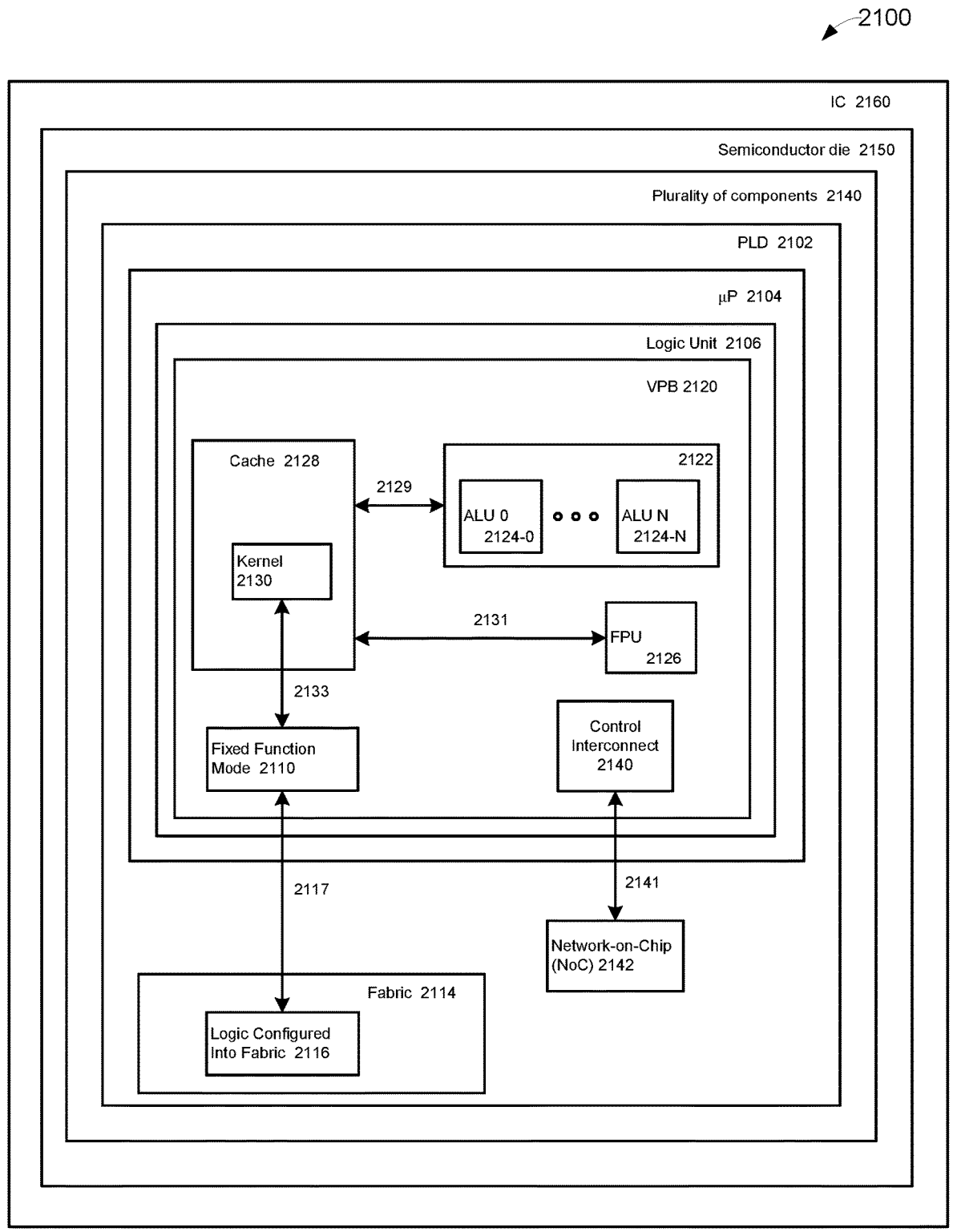
FIG. 21 depicts an example IC with a VPB in communication with a NoC.

FIG. 21 depicts, generally at 2100, an example implementation. At 2160 is an integrated circuit (IC), having a semiconductor die 2150, the semiconductor die 2150 having a plurality of components 2140 including a PLD 2102. The PLD 2102 has at 2104 a microprocessor (μP), at 2142 a network-on-chip (NoC) and at 2114 a fabric. The PLD microprocessor 2104 has a logic unit 2106, which logic unit 2106 has a vector processor block (VPB) 2120. The VPB 2120 has one or more of an arithmetic logic unit (ALU) 2122 shown as ALU 0 to ALU N 2124-0 to 2124-N, or a floating point unit (FPU) 2126, a cache 2128 and a control interconnect 2140. The cache 2128 is shown operable via 2129 or 2131 with the one or more ALUs 2122 or the FPU 2126 respectively. It is noted that the cache 2128 can be external to the ALUs 2122 or the FPU 2126 or disposed within the ALUs 2122 or the FPU 2126. The cache 2128 has a Kernel 2130 that is operable via link 2133 in fixed function mode 2110. The fixed function mode 2110, which emulates a fixed function uses data streamed in from the fabric 2114, via link 2117, from the logic configured into fabric 2116. Control interconnect 2140 is operable via link 2141 to exchange control signals between the VPB 2120 and NoC 2142 of the PLD 2102.

Figure 22:
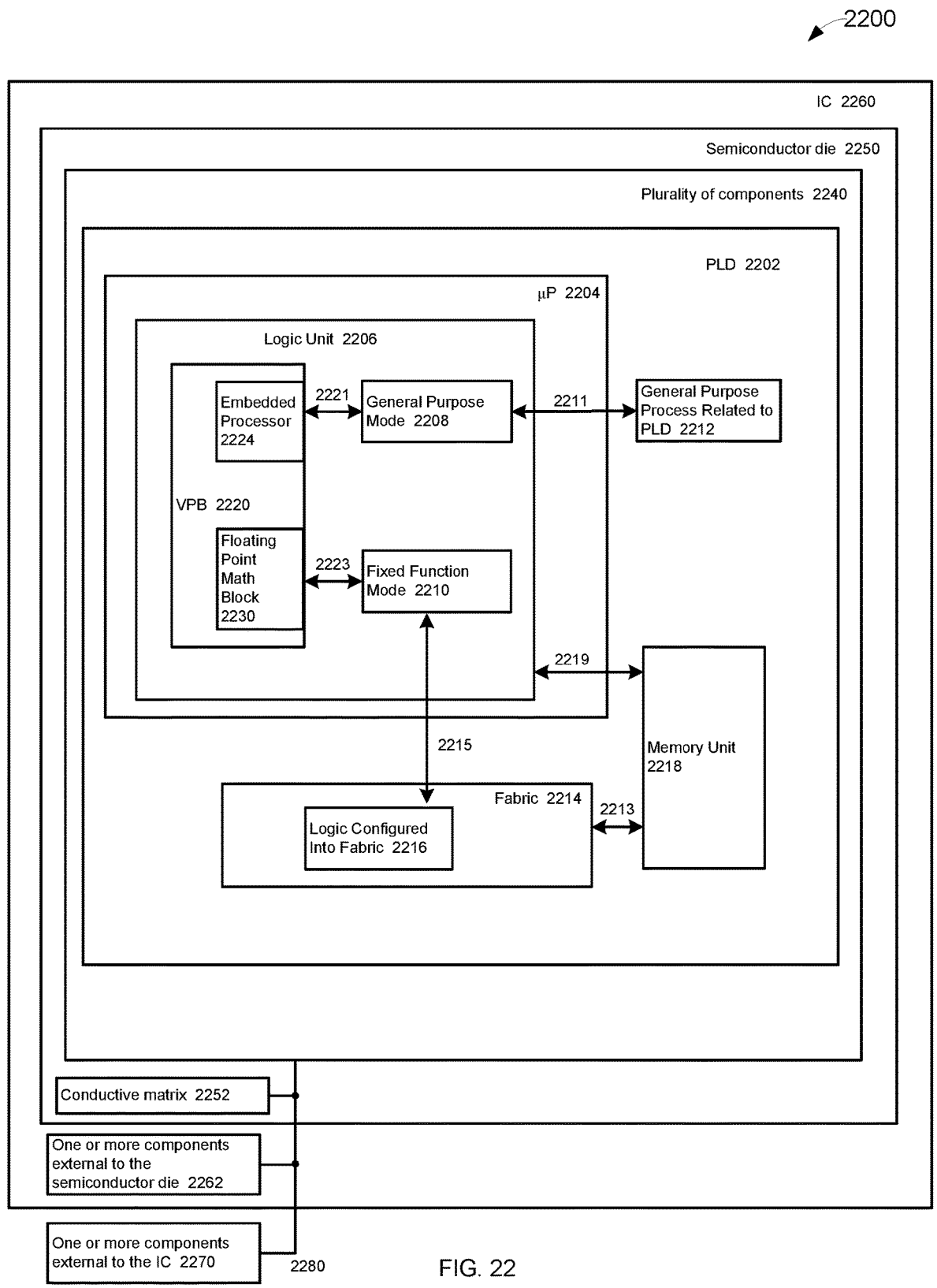
FIG. 22 depicts an example IC with a memory unit.

FIG. 22 depicts, generally at 2200, an example implementation. At 2260 is an integrated circuit (IC) having a semiconductor die 2250 and one or components 2262 external to the semiconductor die 2250. Semiconductor die 2250 has a plurality of components 2240 including a PLD 2202 and a conductive matrix 2252 for coupling a plurality of components 2240. The PLD 2202 has at 2204 a microprocessor (μP), a memory unit at 2218 and at 2214 a fabric. The microprocessor 2204 has a logic unit 2206, which logic unit 2206 has a vector processor block (VPB) 2220 having a general purpose mode 2208 and a fixed function mode 2210. The VPB 2220 is operable as an embedded processor 2224 via link 2221 in the general purpose mode 2208. The VPB 2220 is operable as a floating point math block 2230 via link 2223 in the fixed function mode 2210. Via link 2211 the general purpose mode 2208 is operable with a general purpose process 2212 related to the PLD 2202. Via link 2219 the logic unit 2206 is operable with the memory unit 2218. Fabric 2214 has logic configured into fabric 2216. Via link 2215 the fixed function mode 2210 is operable with the logic configured into fabric 2216. Via link 2213 fabric 2214 is operable with memory unit 2218. One or more components external to the IC 2270 are shown, which may communicate with plurality of components 2240, conductive matrix 2252, or one or more components external to the semiconductor dies 2262 via a representative link 2280.

FIG. 11 at 1130 (and in the associated specification) discusses synchronizing the microprocessor with the fabric, and FIG. 12 at 1260 (and in the associated specification) discusses synchronizing multiple microprocessors. Additionally, at FIG. 19 at 1940, 1937, 1950, and 1951 (and in the associated specification) discusses synchronizing multiple microprocessors. There are multiple approaches to the syncing mechanism. For example, but not limited to, using the PLD fabric to stall microprocessors, using the PLD fabric to start multiple microprocessors (including VPBs) simultaneously, pausing the respective kernels in the microprocessors until valid data is present, using memory mapped load instructions to stall the microprocessors, or using vector load instructions in VPBs to start execution, without limitation. The reason synchronization is beneficial in some examples, is that predictable results can be achieved at predictable times with multiple microprocessors. In this way scheduling of data and results can be communicated to other microprocessors with predictable behavior. That is, for example, the result from one microprocessor can be communicated in time to other microprocessors without microprocessors having to wait to receive the data and results.

Figure 23:
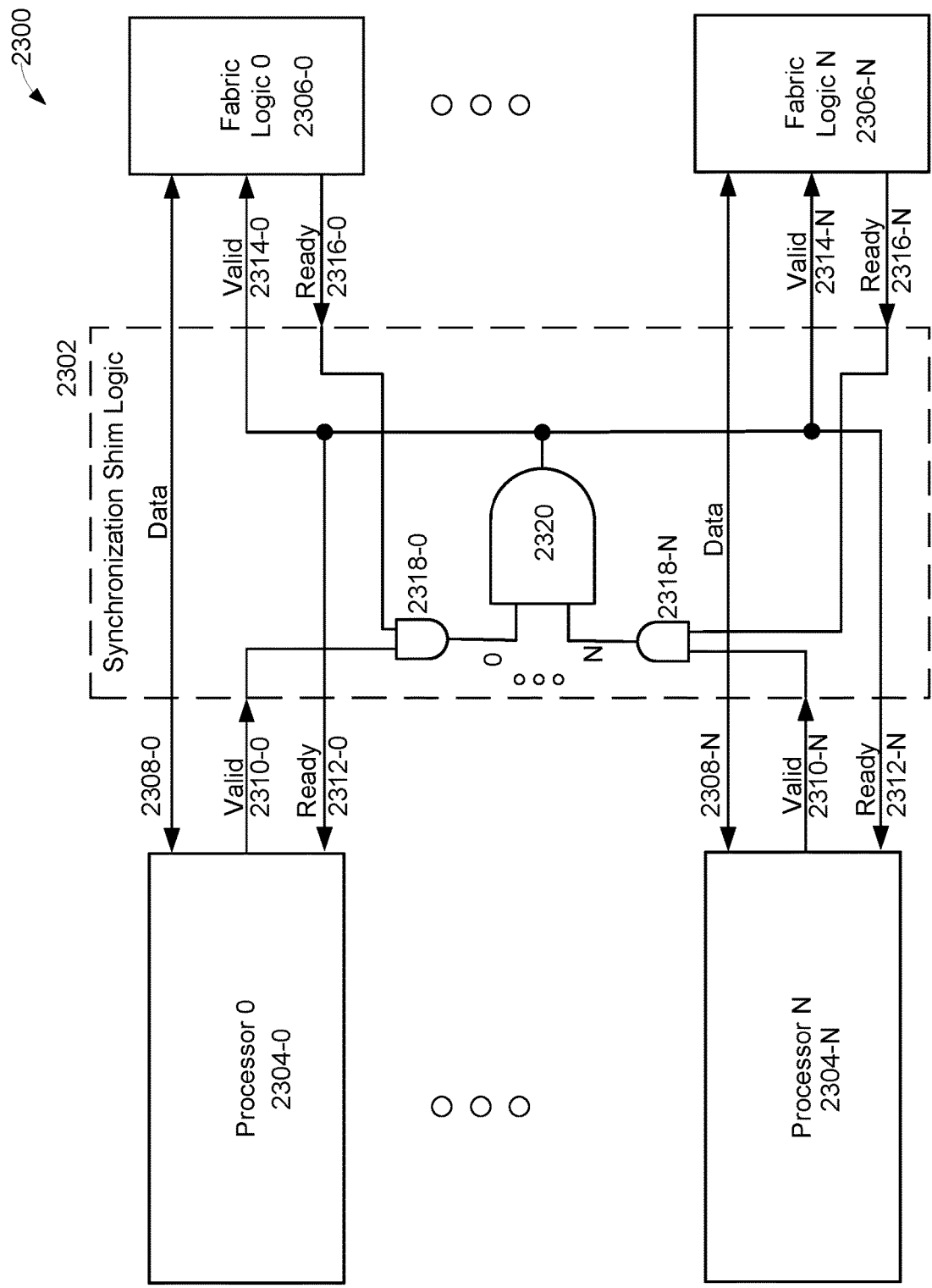
FIG. 23 depicts an example synchronization shim logic.

If the IC is using a communications standard for the PLD, for example, but not limited to the ARM LIMITED (ARM) Advanced Microcontroller Bus Architecture (AMBA) AXI4-Streaming Protocol then one example of multiple microprocessor synchronization is illustrated in FIG. 23 generally at 2300. Shown at 2302 is synchronization shim logic between processors 0 to N (2304-0 to 2304-N) and fabric logic 0 to N (2306-0 to 2306-N). The synchronization shim logic 2302 handles, via the logic illustrated, the AXI4-Streaming READY signals and AXI4-Streaming VALID signals from, and to, the multiple processors 2304-0 to 2304-N and the multiple fabric logic 2306-0 to 2306-N. Note that the data 2308-0 to 2308-N between the respective processor 2304 and fabric logic 2306 is not controlled by the 2302 the synchronization shim logic 2302 but rather goes directly to/from the respective processor 2304 to/from the respective fabric logic 2306.

In FIG. 23 a plurality of processors 2304 is represented by processor 0 to processor N (2304-0 to 2304-N) respectively. Associated with each of the processors (2304-0 to 2304-N) is fabric logic 2306 denoted 0 to N (2306-0 to 2306-N) respectively. For each of the processors 2304 there is a respective valid output denoted 0 to N (2310-0 to 2310-N) and a ready input denoted 0 to N (2312-0 to 2312-N). Likewise for each fabric logic 2306 there is a valid input denoted 0 to N (2314-0 to 2314-N) and ready output denoted 0 to N (2316-0 to 2316-N). In the synchronization shim logic 2302 there are 0 to N AND gates 2318-0 to 2318-N which respectively AND the associated processor valid signal (2310-0 to 2310-N) and the fabric logic ready signal (2316-0 to 2316-N respectively) yielding (after the ANDing) a plurality of processor-valid-fabric-ready signals which are fed into the AND gate 2320. The output of the AND gate (after the ANDing) can be considered a global sync signal which is routed to each of the processors 0 to N ready inputs (2312-0 to 2313-N) and routed to each of the fabric logic 0 to N valid inputs (2314-0 to 2314-N).

While all of the N+1 (0 to N) processors in FIG. 23 are shown synchronized, the example is not so limited. For example, on an IC having many microprocessors certain ones may be synchronized and others may not. Also, different groups of microprocessors may be synchronized differently, or synchronized differently depending on their general purpose mode or fixed function mode.

Figure 24:
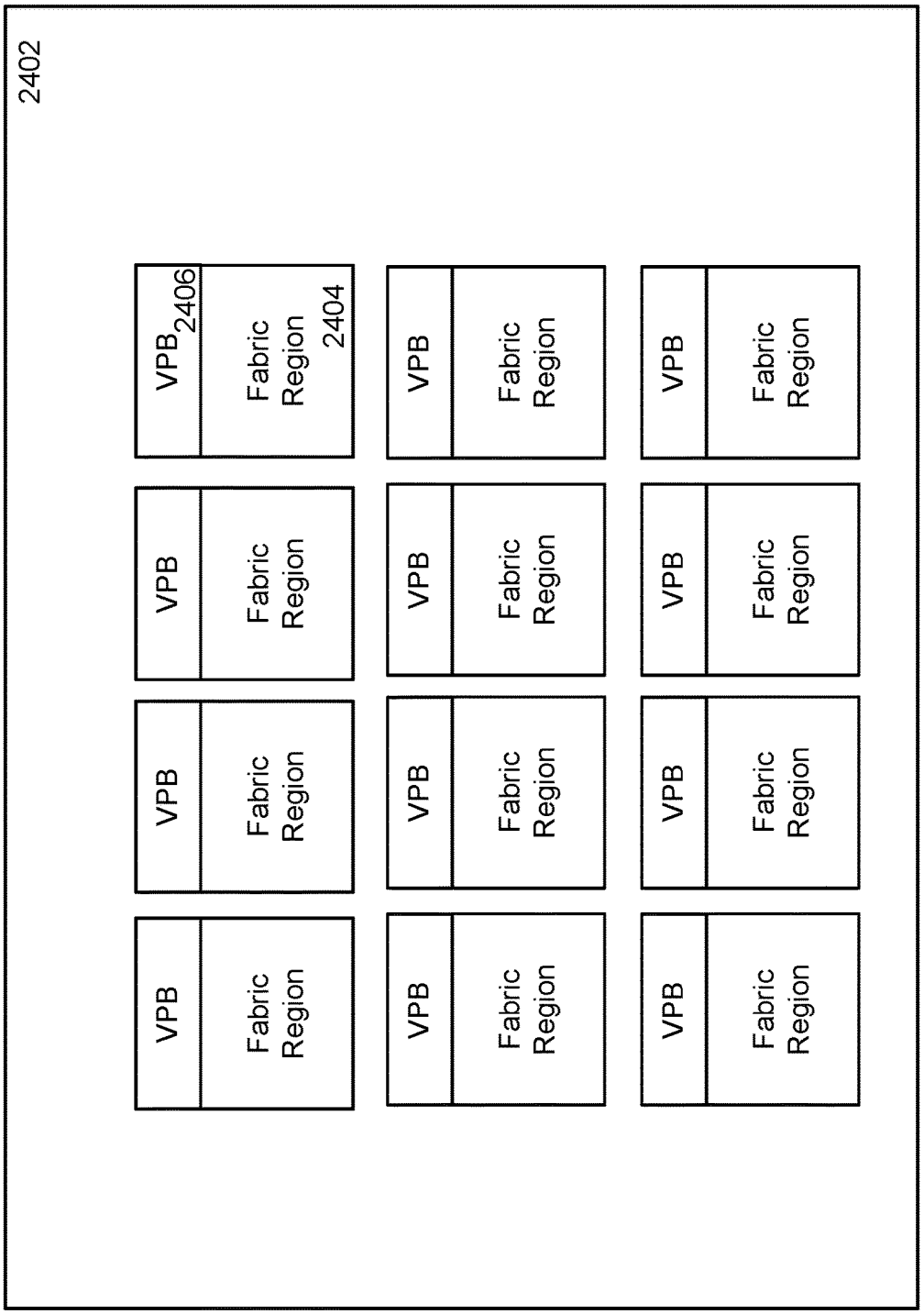
FIG. 24 depicts a die having multiple VPBs and fabric regions.

FIG. 24 depicts, generally at 2400, an example implementation showing a die 2402 having multiple fabric regions as shown by representative fabric region 2404 and multiple VPBs as shown by representative VPB 2406. What is to be appreciated is that VPBs not needed as processors, i.e. operating in general purpose mode, can instead be used by fabric logic as fixed functions, i.e. operating in fixed function mode, such as floating point ALUs, without limitation.

Figure 25:
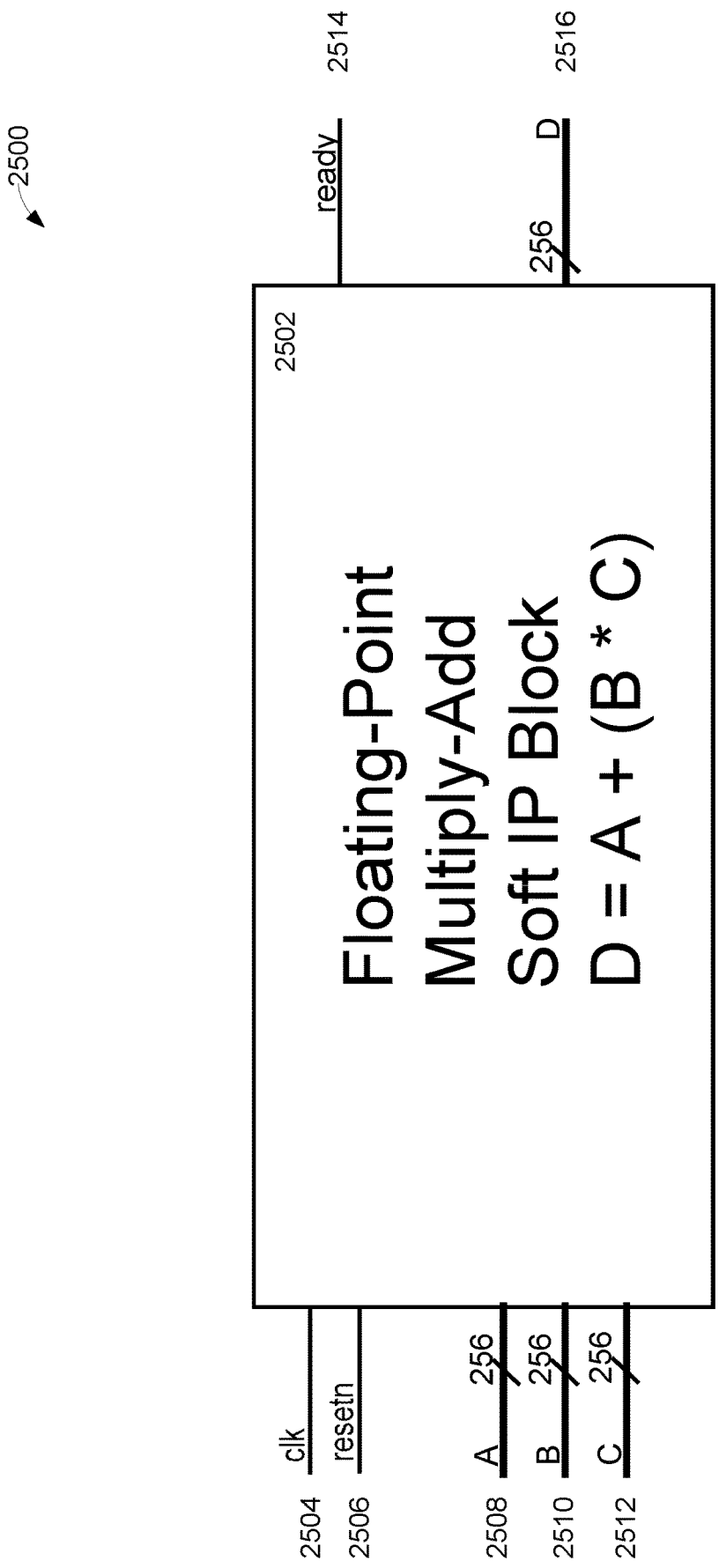
FIG. 25 depicts an example fixed function mode as a floating-point multiply-add block.

FIG. 25 depicts, generally at 2500, an example implementation showing a VPB 2502 in a fixed function mode as a floating-point multiply-add (FPMADD) soft intellectual property (IP) block performing the math function D=A+(B*C). The inputs on the left are a clock (clk) 2504, reset negative active (resetn) 2506, input A 2508, input B 2510, and input C 2512. The inputs A, B, and C are illustrated to be respectively 256 bits wide. The outputs on the right are a ready signal 2514, and an output D 2516 illustrated as 256 bits wide.

Figure 26:
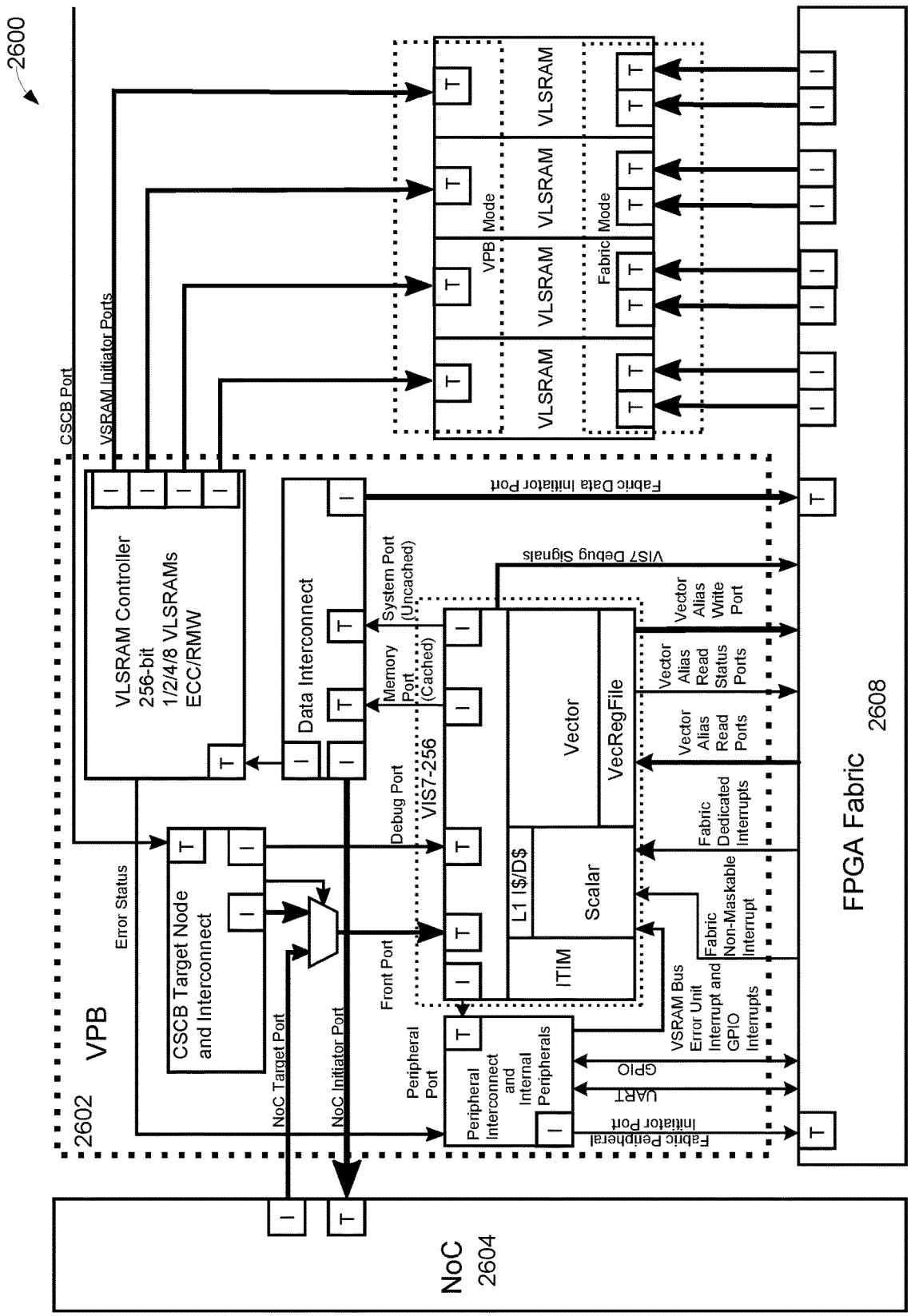
FIG. 26 depicts an example implementation showing major functional blocks and interconnections.

FIG. 26 depicts, generally at 2600, an example implementation showing major functional blocks and interconnections. At 2602 is the VPB, at 2604 a NoC, at 2608 the FPGA fabric.

For FIG. 26 here are some notations:
CSCB—Control, Status, and Configuration Bus
I and T—Initiator and Target, which are more commonly known as Master and Slave
VPB—Vector Processor Block (which may also be called DVP—Distributed or Digital Vector Processor).
NoC—Network-on-Chip
VLSRAM—Very-Large Static Random Access Memory. Large on-chip memories that are part of the FPGA SoC.
ECC—Error Correction Code
RMW—Read/Modify/Write
VIS7 is a part number from SiFive, Inc. indicating certain features of the processor.
L1 I$/D$ is level one instruction cache and data cache
ITIM—Instruction Tightly Integrated Memory
DLS—Data Local Store
VecRegFile—Vector Register File
FPGA—Field Programmable Gate Array (a PLD)
Regarding I and T notations it should be noted that I and T are Initiator and Target, which may also be known as Master and Slave respectively. The arrows go from Initiator to Target. The arrow indicates who initiates requests and what target(s) they go to, but the requests themselves can be reads from a target or writes to a target, so there may be data wires going in both directions on all I→T buses.

What is claimed, is:
1. An apparatus comprising:
a microprocessor embedded in a programmable logic device (PLD), the microprocessor including a logic unit having a vector processor block (VPB) that includes one or more of an arithmetic logic unit (ALU) or a floating point unit (FPU), the logic unit operable in two modes, which comprise:
a general purpose mode running at least one general purpose process related to the PLD; and
a fixed function mode emulating a fixed function for use by logic configured into a fabric of the PLD (fabric), emulated fixed function computed using data streamed in from the fabric, wherein the microprocessor is synchronized with the fabric;
a memory unit coupled to the logic unit and to the fabric, wherein the fabric is operable for transferring signals with the logic unit in relation to the fixed function, and
a cache disposed in or coupled to the ALU or FPU, the cache comprising a kernel stored therewith and operable in relation to the emulated fixed function, the kernel including code relating to an infinite loop program stored in the cache, the start of the infinite loop program triggered by the fabric.

2. An apparatus comprising:
a microprocessor embedded in a programmable logic device (PLD), the microprocessor including a logic unit having a vector processor block (VPB) that includes one or more of an arithmetic logic unit (ALU) or a floating point unit (FPU), the logic unit operable in two modes, which comprise:

a general purpose mode running at least one general purpose process related to the PLD; and
a fixed function mode emulating a fixed function for use by logic configured into a fabric of the PLD (fabric);
a memory unit coupled to the logic unit and to the fabric, wherein the logic is operable for transferring signals with the logic unit in relation to the fixed function,
a cache disposed in or coupled to the ALU or FPU, the cache comprising a kernel stored therewith and operable in relation to the emulated fixed function, wherein the emulated fixed function is computed using a streamed in the fabric, wherein the VPB comprises:
a data interconnect coupled to the cache and to the fabric, the data interconnect to transfer data signals between the fabric and the VPB; and
a controller coupled to the data interconnect and to the memory unit.

3. The microprocessor as described in claim 2, wherein the VPB comprises a control interconnect to exchange control signals between the VPB and a network-on-chip of the PLD.

4. The microprocessor as described in claim 2, wherein the VPB is operable:
as an embedded processor in relation to the corresponding general purpose mode; and
as a floating-point mathematics block in relation to the fixed function mode.

5. A method comprising:
upon a logic unit receiving a control signal from a fabric of a programmable logic device (PLD), emulating a fixed function for use by a logic configured into the fabric;
upon an absence of the control signal from the fabric at an input of the logic unit, executing at least one general purpose process related to an operation of the PLD; and
exchanging signals with a memory unit coupled to the logic unit and to the fabric, wherein the fabric is operable for transferring signals with the logic unit in relation to the fixed function,
wherein the logic unit comprises a vector processor block (VPB) operable in relation to at least a first mode corresponding to the emulating, and a second mode corresponding to the executing,
wherein the VPB comprises one or more of an arithmetic logic unit (ALU) or a floating point unit (FPU), and a cache disposed in or coupled to the ALU or FPU, the cache comprising a kernel stored therewith and operable in relation to the emulating, the kernel including code relating to an infinite loop program stored in the cache;
computing the emulated fixed function using data streamed in from the fabric;
triggering a start of the infinite loop program from the fabric; and
synchronizing a microprocessor with the fabric.

6. The method as described in claim 5, comprising synchronizing the microprocessor with one or more other microprocessors of the PLD that are coupled to the fabric.

7. The method as described in claim 5, comprising:
transferring data signals between the fabric and the VPB via a data interconnect coupled to the cache and to the fabric; and
controlling the memory unit in relation to the transferred data signals.

8. The method as described in claim 7, wherein the VPB comprises a control interconnect, the method comprising:

exchanging control signals between the VPB and a network-on-chip of the PLD.

9. The method as described in claim 7, wherein the VPB is operable as an embedded processor in relation to the corresponding second mode, and in relation to the first mode, the method comprises operating the VPB as a floating-point mathematics block for use by the configured logic of the fabric, in relation to the first mode.

10. The method of claim 5 further comprising:
receiving from respective ones of a plurality of the fabric, for respective ones of a plurality of the microprocessors, respective ready signals;
ANDing the respective ready signals with a respective valid signal from the respective ones of the plurality of the microprocessors, yielding a respective plurality of processor-valid-fabric-ready signals;
ANDing the respective plurality of the processor-valid-fabric-ready signals, yielding a global sync signal; and
sending the global sync signal to a respective ready input of the respective plurality of the microprocessors and sending the global sync signal to a respective fabric logic valid input of the respective plurality of the fabric.

11. An integrated circuit (IC) device, comprising:
a semiconductor die;
a conductive matrix disposed within the semiconductor die to communicatively couple a plurality of components of the IC device disposed within the die and one or more components external thereto; and
a programmable logic device (PLD) disposed within the semiconductor die and comprising components coupled using the matrix, the PLD comprising a microprocessor and a memory unit, wherein:
the microprocessor including a logic unit having a vector processor block (VPB) that includes an arithmetic logic unit (ALU) or a floating point unit (FPU), the logic unit operable in:
a general purpose mode running at least one general purpose process related to the PLD; and
a fixed function mode emulating a fixed function for use by logic configured into a fabric of the PLD (fabric); and
wherein:
the memory unit is coupled to the logic unit and to the fabric, wherein the fabric to transfer signals with the logic unit in relation to the fixed function,
the VPB includes a cache disposed in or coupled to the ALU or FPU, the cache comprising a kernel stored therewith operable in relation to the emulated fixed function, wherein the emulated fixed function is computed using data streamed in from the fabric,
the kernel comprises code relating to an infinite loop program stored in the cache,
a start of the infinite loop program is triggered by the fabric, and
the microprocessor is synchronized with the fabric.

12. The IC device as described in claim 11, wherein the VPB comprises:
a data interconnect coupled to the cache and to the fabric to transfer data signals between the fabric and the VPB; and
a controller coupled to the data interconnect and to the memory unit.

13. The IC device as described in claim 11, wherein the VPB comprises a control interconnect to exchange control signals between the VPB and a network-on-chip of the PLD.

14. The IC device as described in claim 11, wherein the VPB is operable:

as an embedded processor in relation to the corresponding general purpose mode; and as a floating-point mathematics block for use by the configured logic of the fabric in relation to the fixed function mode.

\* \* \* \* \*

UNITED STATES PATENT AND TRADEMARK OFFICE
CERTIFICATE OF CORRECTION

| | | |
|---|---|---|
| PATENT NO. | : 12,223,322 B2 | Page 1 of 1 |
| APPLICATION NO. | : 17/852304 | |
| DATED | : February 11, 2025 | |
| INVENTOR(S) | : Aaron Severance et al. | |

It is certified that error appears in the above-identified patent and that said Letters Patent is hereby corrected as shown below:

In the Claims

Column 13, Line 7 replace "logic" with --fabric--.
Column 13, Line 12 replace "a" with --data--.
Column 13, Line 13 replace "streamed in the" with --streamed in from the--.

Signed and Sealed this
Thirtieth Day of September, 2025

John A. Squires
*Director of the United States Patent and Trademark Office*